United States Patent [19]

Miyazaki et al.

[11] Patent Number: 5,215,093
[45] Date of Patent: Jun. 1, 1993

[54] ULTRASONIC COLOR DOPPLER DIAGNOSTIC APPARATUS

[75] Inventors: Toshiya Miyazaki; Akira Shiba; Keiichi Murakami; Takaki Shimura; Junichi Tanahashi; Takashi Toriu, all of Kawasaki, Japan

[73] Assignee: Fujitsu Limited, Kawasaki, Japan

[21] Appl. No.: 786,888

[22] Filed: Nov. 1, 1991

[30] Foreign Application Priority Data

Nov. 2, 1990 [JP] Japan .................. 2-298301

[51] Int. Cl.⁵ .................................. A61B 8/00
[52] U.S. Cl. ............................... 128/661.09
[58] Field of Search ........... 128/660.05, 661.09

[56] References Cited

U.S. PATENT DOCUMENTS 4,817,617  4/1989  Takeuchi et al. ............ 128/660.05
5,016,641  5/1991  Schwartz ..................... 128/661.09

Primary Examiner—Francis Jaworski
Attorney, Agent, or Firm—Staas & Halsey

[57] ABSTRACT

An ultrasonic color Doppler diagnostic apparatus for displaying at least two successive frames of original images of the two-dimensional images obtained for each ultrasonic interframe time, to find and display a natural interpolated image. The apparatus includes a shape parameter calculating unit which calculates the shape parameters characterizing the shape of a blood flow region on the original images and, a shape parameter interpolating unit which calculates the shape parameters interpolated at a designated timing designated in the interframe time from the shape parameters, the interframe time. In addition and the designated timing, an image converting unit is provided which converts the image of at least one frame of the original image in the plurality of original images in accordance with the shape parameters at a designated timing found by the shape parameter interpolating means to obtain the interpolated image. Further, displaying means is included which displays a moving image comprised of the interpolated images inserted between the original images and moving images of only the interpolated images.

23 Claims, 39 Drawing Sheets

Fig. 4A

ARRAY OF PIXELS
OF ORIGINAL IMAGE
(x, y)

| i-1,j-1 | i-1,j | i-1,j+1 | | |
|---|---|---|---|---|
| i,j-1 | i,j | i,j+1 | | |
| i+1,j-1 | i+1,j | i+1,j+1 | | |
| | | | | |
| | | | | |

Fig. 4B

ARRAY OF PIXELS OF
INTERPOLATED IMAGE
(xh, yh)

TIMING OF ORIGINAL IMAGE RECORDAL

TIMING OF FLOW IMAGE DISPLAY

TIMING OF B MODE IMAGE

THIRD-ORDERED FUNCTION

POSITIVE AVERAGE FLOW RATE REGION
NEGATIVE AVERAGE FLOW RATE REGION

NEGATIVE AVERAGE FLOW RATE REGION
POSITIVE AVERAGE FLOW RATE REGION

MOSAIC PATTERN REGION

NORMAL REGION

NORMAL REGION

MOSAIC PATTERN REGION

POSITIVE AVERAGE FLOW RATE

POSITIVE AVERAGE FLOW RATE

Fig. 21A

BINARY IMAGE FRAME MEMORY

Fig. 21B

LABEL FRAME MEMORY

LABELING →

Fig. 21C

LABEL 2 = LABEL 1
LABEL 4 = LABEL 3

LABEL REWRITING

LABEL FRAME MEMORY

Fig. 21D

RANGE OF MEASUREMENT

RANGE OF MEASUREMENT OF
BLOOD FLOW SPEED DATA

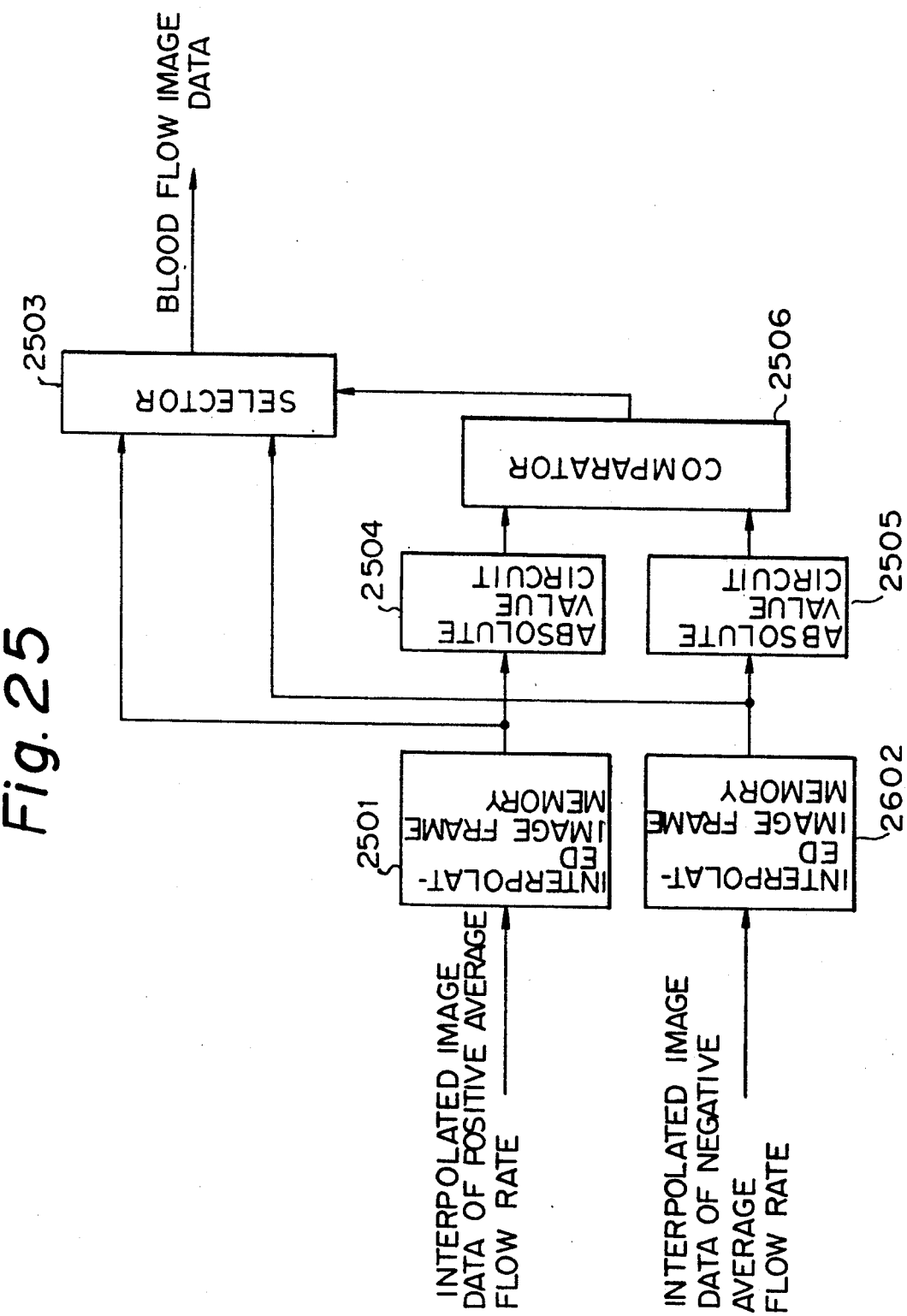

DISPLAYED IMAGE
= INTERPOLATED IMAGE

PRIOR ART
Fig. 33A      Fig. 33B      Fig. 33C
 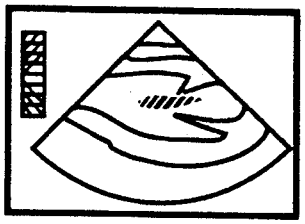 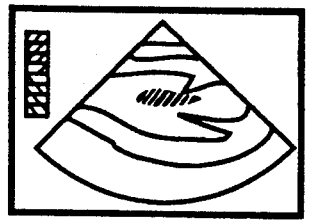
Fig. 33D      Fig. 33E      Fig. 33F
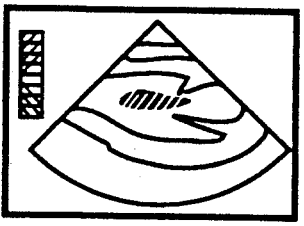 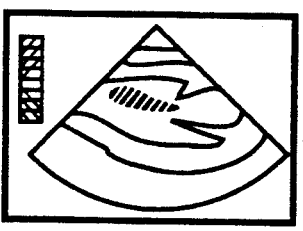 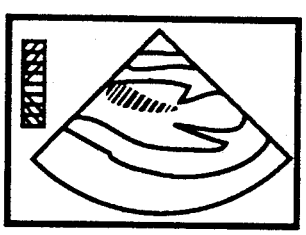
Fig. 33G
TIMING OF IMAGE DISPLAY
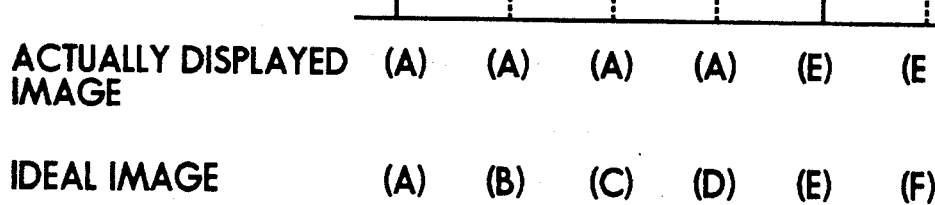

PRIOR ART
Fig. 37A  Fig. 37B  Fig. 37C
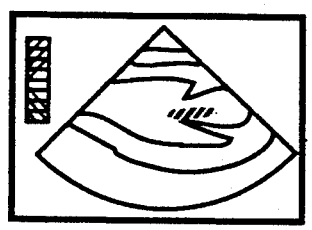 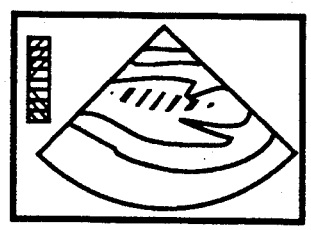 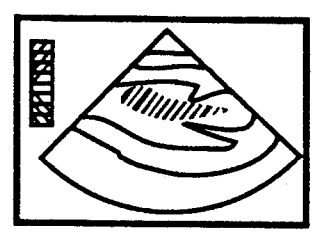
Fig. 37D  Fig. 37E  Fig. 37F
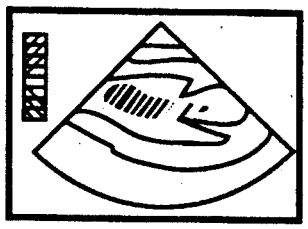 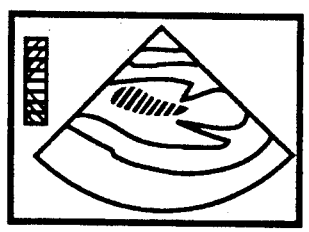 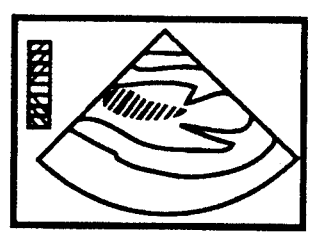
Fig. 37G
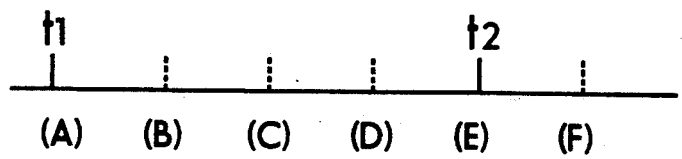

ULTRASONIC COLOR DOPPLER DIAGNOSTIC APPARATUS

BACKGROUND OF THE INVENTION

1. Field of the Invention

The present invention relates to an ultrasonic color Doppler diagnostic apparatus which performs image interpolation so as to improve the ultrasonic frame rate in appearance. In recent years, the importance of obtaining a grasp or understanding of the state of blood behavior in the heart and the carotid arteries has been rising or increasing in the field of clinical diagnosis. The present invention here is an ultrasonic color Doppler diagnostic apparatus which can display color images of the state of blood behavior safely and simply in real time.

2. Description of the Related Arts

Conventional ultrasonic color Doppler diagnostic apparatuses display in real time a combination of the B mode (Brightness) image of the muscle of the heart or other organ in the specimen or subject under examinations and the average speed, speed dispersion, or Doppler signal power of the blood flowing through a specimen (hereinafter referred to as blood flow speed data). These convectional apparatuses enabled observation of the flow of blood in body organs and was extremely convenient in obtaining a grasp of the state of the blood behavior in the organs.

As described in more detail later with reference to the drawings, ideally, it is desired to see the blood flow changing slowly and smoothly with each television frame. However, there is the problem that the image changes in spurts, and the doctor using the conventional apparatuses or considered the movement of the heart and changes in the state of the blood flow as awkward or confusing and therefore could not make a sufficient or reliable diagnosis. The following three methods were considered in the prior art to overcome this problem:

First, as the first conventional method, the control of the beam former was changed so as to reduce the number of ultrasonic pulses and received in the same direction of the specimen. This change in control was accomplished by changing the direction of sending and receiving signals in rough angles, or in the alternative, the range of angles of signal transmission and reception was made narrower so as to substantially improve the ultrasonic frame rate. In this first method, however, the flow rate data obtained could only be obtained at rough positions in two dimensions, or for the alternative method the flow rate data could only be obtained in a narrow range of angles. As a result, there was an undeniable a deterioration of the quality of the flow image as compared with the usual display.

As a second conventional method, simultaneous multidirectional signal transmission and reception was used so as to obtain signals received from a plurality of directions. In this second conventional method, at least a plurality of beam formers were necessary, so inevitably the cost was higher and the apparatus was larger in size, which was not necessarily satisfactory to the user. In addition, cost reductions made possible by advances in semiconductor technology further cannot be expected to contribute much in terms of the cost or size of beam formers.

As a third conventional method, an interpolation and a weighting are employed to obtain an estimated image between two original images.

In this third conventional method, it is possible to improve the apparent ultrasonic frame rate simply and inexpensively. However, when the position and angle of the blood flow differ greatly among the original images, then, a false blood flow completely different from the true images ends up being displayed and there is the danger of mistaken diagnosis.

SUMMARY OF THE INVENTION

The object of the present invention is to improve the above three methods and to provide an apparatus which increases the apparent ultrasonic frame rate without the above defect, that is, finds from the images of the natural interpolated images and displays the same.

To attain the above object, there is provided, according to the present invention, an ultrasonic color Doppler diagnostic apparatus for displaying at least two successive frames of original images of the two-dimensional images obtained for each ultrasonic interframe time, provided with a function of transmitting an ultrasonic pulse in a plurality of directions with respect to a specimen. The apparatus is also provided with a functions for processing the signal received, and displaying the results as a two-dimensional image of either the average speed, speed dispersion, or Doppler signal power of blood flowing in the specimen.

The apparatus includes a shape parameter calculating unit for calculating the shape parameters characterizing the shape of blood flow regions on the original images, and a shape parameter interpolating unit for calculating the shape parameters interpolated at a designated timing designated in the interframe time from the shape parameters, the interframe time, and the designated timing. In addition, an image converting unit as provided for converting the image of at least one frame of the original image in the plurality of original images in accordance with the shape parameters at a designated timing found by the shape parameter interpolating means to obtain an interpolated image. Further a displaying unit is provided which displays a moving image comprised of the interpolated images inserted between the original images and moving images of only the interpolated images.

According to an aspect of the present invention, the apparatus further includes a weighted averaging unit for weighting the interpolated image obtained by the image converting unit and for averaging the weighted interpolated images. The weighted averaging unit includes a first weighting unit for weighting, by a value (t2—th)/(t2—t1) which is a first interpolated image, where t1 is a first timing corresponding to a first frame original image, t2 is a second timing corresponding to a second frame original image, and th is the designated timing. The first interpolated image is obtained by the image converting means convention the first frame original image. In addition, as weighting measuring unit modules a second weighting unit for weighting a second interpolated image by the value (t2—th)/(t2—t1), where the second interpolated image is obtained, by the image converting means, converting the second frame original image; and an adding unit for adding the weighted first and second interpolated images.

According to another aspect of the present invention, the shape parameter interpolating unit is a shape parameter linear interpolating means for performing linear interpolation on the shape parameters of a second frame original image. The linear interpolation is performed in accordance with the interframe time and the designated timing and the shape parameter linear interpolation thereby calculates interpolated shape parameters.

According to still another aspect of the present invention, the shape parameter interpolating unit is a shape parameter high order interpolating unit for calculating any function passing through the shape parameters of at least three frames of original images; The shape parameter interpolating unit then for, calculates the interpolated shape parameters at the designated timing as values of the function at the designated timing.

According to a still further aspect of the present invention, the apparatus further provides a shape parameter averaging means for averaging a plurality of frames worth of shape parameters for each frame calculated in the shape parameter calculating means.

According to a still further aspect of the present invention, the apparatus further comprises a characteristic judgment unit for judging or determining either the characteristic of the average speed, speed dispersion, or Doppler signal power of the blood flowing in a specimen at the pixels of the original image. In addition, an image dividing means is provided which divides into a plurality of images the original image in accordance with either the characteristic of the average speed, speed dispersion, or Doppler signal power of the blood flowing in the specimen the divided images obtained by the division being deemed as original images. The image checking means then finds the interpolated images with respect to or using the divided images.

In the above described apparatus, the characteristic judging unit may be a sign judging unit for performing a judgment or determination of the sign of the average speed.

In the above described apparatus also, the characteristic judging unit may be a mosaic pattern judging unit for judging that the number of the pixels having an average speed of over a predetermined speed +Vth and the number of pixels having an average speed less than a predetermined speed —Vth, including a particularly noted pixel together are more than a predetermined number so that the pattern is a mosaic one.

In the above described apparatus also, the characteristic judging unit may be a labeling means for applying the same label to pixels constituting or forming connecting portions for each connecting portion where pixels adjoin and form a single cluster.

According to a still further aspect of the present invention, the apparatus further comprises a blood flow region presence judging unit for judging if there is a region in which blood is flowing in at least one original image in the two frames of original images; In addition, an image interpolation bypassing unit is provided which bypasses the said image converting unit in accordance with the results of the above detection and thereby directly inputs the original image in the weighted averaging means.

According to a still further aspect of the present invention, the displaying unit has a display suppressing unit which suppresses the display of pixels outside of the range of measurement of either the average speed, speed dispersion, or Doppler signal power of blood flowing in a specimen.

According to a still further aspect of the present invention, the displaying unit comprises an interpolated image synthesizing unit which displays, among the pixels of the interpolated images obtained from the plurality of divided images, the pixels with the maximum absolute values of the average speed of the blood flow.

According to a still further aspect of the present invention, a two-dimensional image of either the average speed, speed dispersion, or Doppler signal power of the blood flowing through a specimen is used as the original image and at the same time use is made of a B mode image as an original image to produce and display an interpolated image of the B mode image.

According to a still further aspect of the present invention, the apparatus further, includes an image separating unit for separating a B mode image and a two-dimensional image of either the average speed, speed dispersion, or Doppler signal power of the blood flowing in the specimen from an NTSC (National Television Standards Commission) RGB (Red Green-Blue), or other image signal. In addition, a flow rate data normalizing unit is insulated for normalizing the pixel value of the two-dimensional image of either the average speed, speed dispersion, or Doppler signal power of blood flowing in a specimen, using a pixel value of a color bar showing the correspondence between either the average speed, speed dispersion, or Doppler signal dispersion of blood flowing in a specimen and color.

According to a still further aspect of the present invention, the apparatus further provides an original image frame memory for three or more frames, and an original image selecting unit for selecting two frames of original images from the original image frame memory. In addition, an interpolated image frame memory is provided for storing interpolated images, and a displayed frame selecting unit for selecting any one frame in the original image frame memory and interpolated image frame memory, the interpolated image being displayed at the time of reproduction of a cine loop.

The above described apparatus may further comprise a display format for notifying at the time of cine loop reproduction or freezing if the displayed image is an original image or an interpolated image.

In the above described apparatus, a frame to be frozen at the time of reproduction of the cine loop may be specified as an original image frame.

BRIEF DESCRIPTION OF THE DRAWINGS

FIGS. 3A, 3B, 3C, 3D, 3E and 3G, FIGS. 4A and 4B, FIGS. 5A and 5C, and FIG. 6 are explanatory views of the principle of the first embodiment;

FIGS. 20A, 20B, 20C, 20D, 20E and 20F and FIGS. 21A, 21B, 21C and 21D are explanatory views of the principle of the seventh embodiment;

FIG. 25 is a constitutional view of the 10th embodiment of the present invention;

FIGS. 33A, 33B, 33C, 33D, 33E, 33F and 33G, FIGS. 34A, 34B, 34C and 34G, FIGS. 35A and 35B, FIG. 36, and FIGS. 37A, 37B, 37C, 37D, 37E, 37F and 37G are views explaining the conventional problems.

DESCRIPTION OF THE PREFERRED EMBODIMENTS

For a better understanding of the present invention, conventional art will be first described with reference to the drawings.

Figure 32:
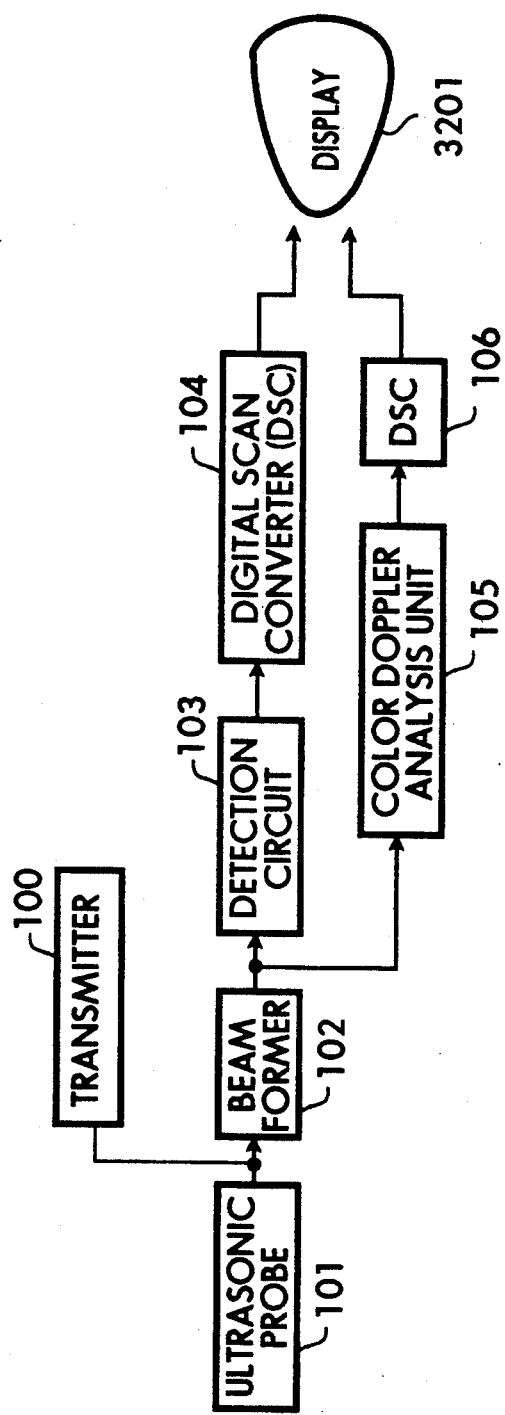
FIG. 32 is a view showing one example of the conventional apparatus.

FIG. 32 shows a conventional apparatus.

In the figure reference numeral 100 is a transmitter for transmitting an ultrasonic wave signal, 101 is an ultrasonic probe which sends and receives an ultrasonic wave signal and 102 is a beam former which forms an ultrasonic beam. Reference numeral 103 is a detection circuit which detects the ultrasonic signal output from the beam former 102 and 104 is a digital scan converter (DSC) which receives as input the detection signal and outputs B mode image data. Reference numeral 105 is a color Doppler analysis unit which calculates the blood flow speed data from the ultrasonic signal, and 106 is a digital scan converter (DSC) which converts the blood flow speed data to flow image data and outputs the same.

Reference numeral 3201 is a displaying unit, which displays the original images, interpolated images, and B mode images.

The displaying unit 3201 displays the B mode images and the flow images. Here, in the conventional apparatus, the blood flow speed data was acquired while sending and receiving a plurality of ultrasonic pulses in the same direction of the specimen, at a frame rate of 10 frames. However even though the television frame rate is 30 frames, the ultrasonic frame rate is limited to about 10 frames. Therefore, ideally, for example, while it is desired to see the blood flow changing slowly and smoothly with each television frame as in FIGS. 33A, 33B, 33C, 33D, 33E, and 33F, in the case of 7.5 ultrasonic frames, there is the problem that the actually displayed image changes in spurts like the images A, A, A, A, E, E as shown in FIG. 33G where the letters A and E represent the images shown in FIGS. 33(A) and 33(E), respectively. Thus the doctor using the apparatus may consider the movement of the heart and changes in the state of the blood flow was awkward or confusing and therefore, may not is able to make a sufficient or reliable diagnosis. The following three methods were considered in the prior art to overcome this problem.

Figure 34A:
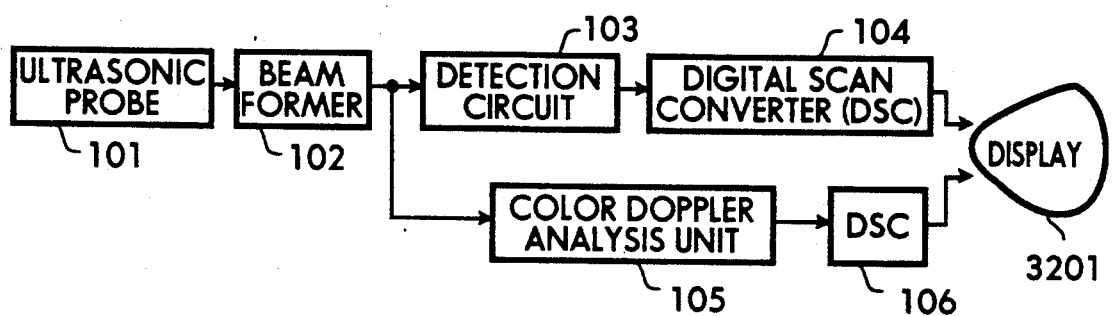
Figure 34B:
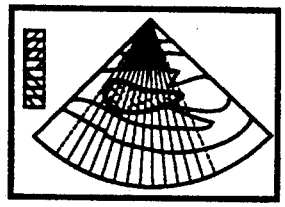
Figure 34C:
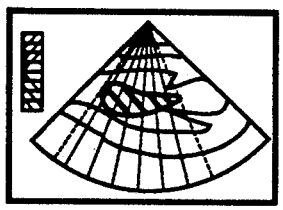
Figure 34D:
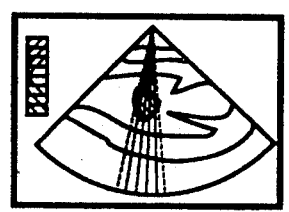

First, as the first conventional method, the control of the beam former 102 of FIG. 34A was changed so as to reduce the number of ultrasonic pulses sent and received in the same direction of the specimen by changing the direction of sending and receiving signals in rough angles as shown in FIG. 34C. Alternatively the range of angles of signal transmission and reception was made narrower as shown in FIG. 34D so as to substantially improve the ultrasonic frame rate. By these changes, the time required for scanning the specimen can be shortened, in comparison with the full scanning shown in FIG. 34B. In this first method, however, by changing the direction of sending and receiving signals the flow rate data obtained could only be obtained at rough positions in two dimensions as shown in FIG. 34C. In addition using the alternative method the flow rate data could only be obtained in a narrow range of angles as shown in FIG. 34D. As a result, there was undeniably a deterioration of the quality of the flow image as compared with the usual or unaltered display as shown in FIG. 34B.

Figure 35A:
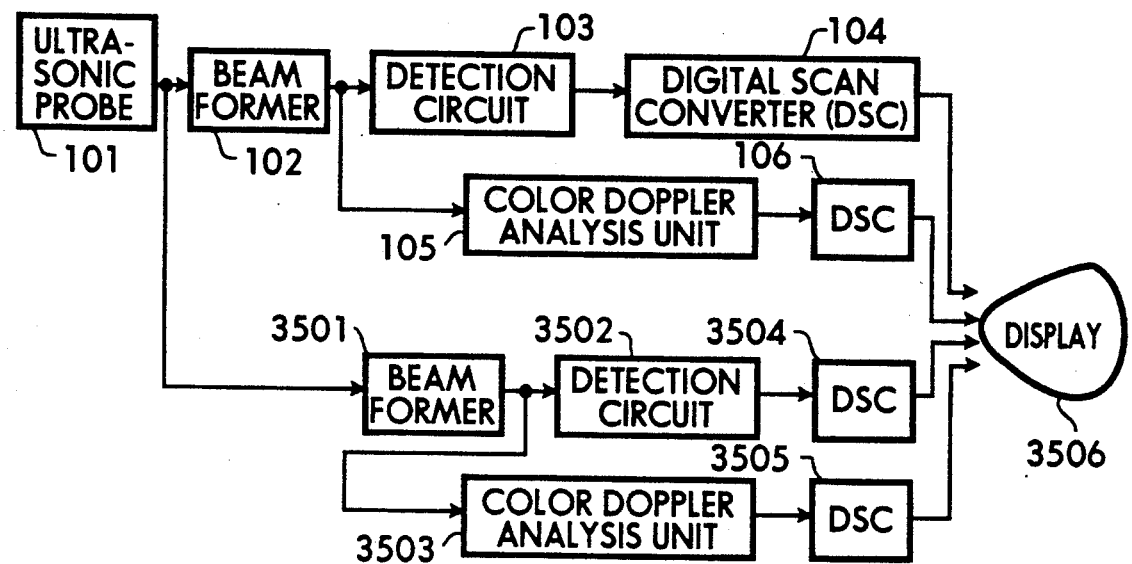
Figure 35B:
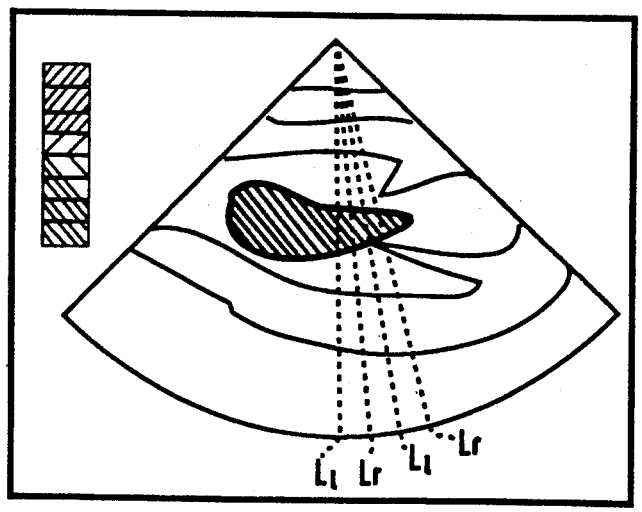

As a second conventional method, as shown in FIG. 35A, simultaneous multidirectional signal transmission and reception was used so as to obtain signals received from a plurality of directions, as shown by Lr and li in FIG. 35B, using a single transmission. By this method, an apparatus was realized which substantially improved the ultrasonic frame rate. In FIG. 35A, reference numeral 101 is an ultrasonic probe which sends and receives an ultrasonic wave. The output of the ultrasonic probe 101 is connected to two beam formers 102 and 3501. The beam former 102 forms an ultrasonic beam. Reference numeral 103 is a detection circuit which detects an ultrasonic signal output from the beam former 102, 104 is a digital scan converter which receives as input the detection signal and outputs the B mode image data, and 105 is a color Doppler analysis unit which calculates the blood flow speed data from the ultrasonic signal. Reference numeral 106 is also a digital scan converter (DSC) which converts the blood flow speed data to flow image data and outputs the same.

The beam former 3501 also forms an ultrasonic beam having a direction slightly different from the direction of the ultrasonic beam generated from the beam former 102. Reference numeral 3502 is a wave detection circuit which detects the ultrasonic signal output from the beam former 3501, 3504 is a digital scan converter (DSC) which receives as input the detection signal and outputs a B mode image data, and 3503 is a color Doppler analysis unit which calculates the blood flow speed data from the ultrasonic signal. Reference numeral 3505 is also a digital scan converter (DSC) which converts the blood flow speed data to flow image data and outputs the same.

Reference numeral 3506 is a displaying unit which displays the B mode images and the flow images. Even when both of the beam formers 102 and 3501 generate ultrasonic beams for rough scannings, the combined images on the displaying unit 3506 may result, as a whole or together, in a high density image.

In this, second conventional method, however, at least a plurality of beam formers is necessary, so inevitably the cost becomes higher and the apparatus becomes larger in size, which is not necessarily satisfactory for the user. In addition cost reductions made possible by advances in semiconductor technology further is not expected to contribute much in terms of the price or size beam formers.

Figure 36:
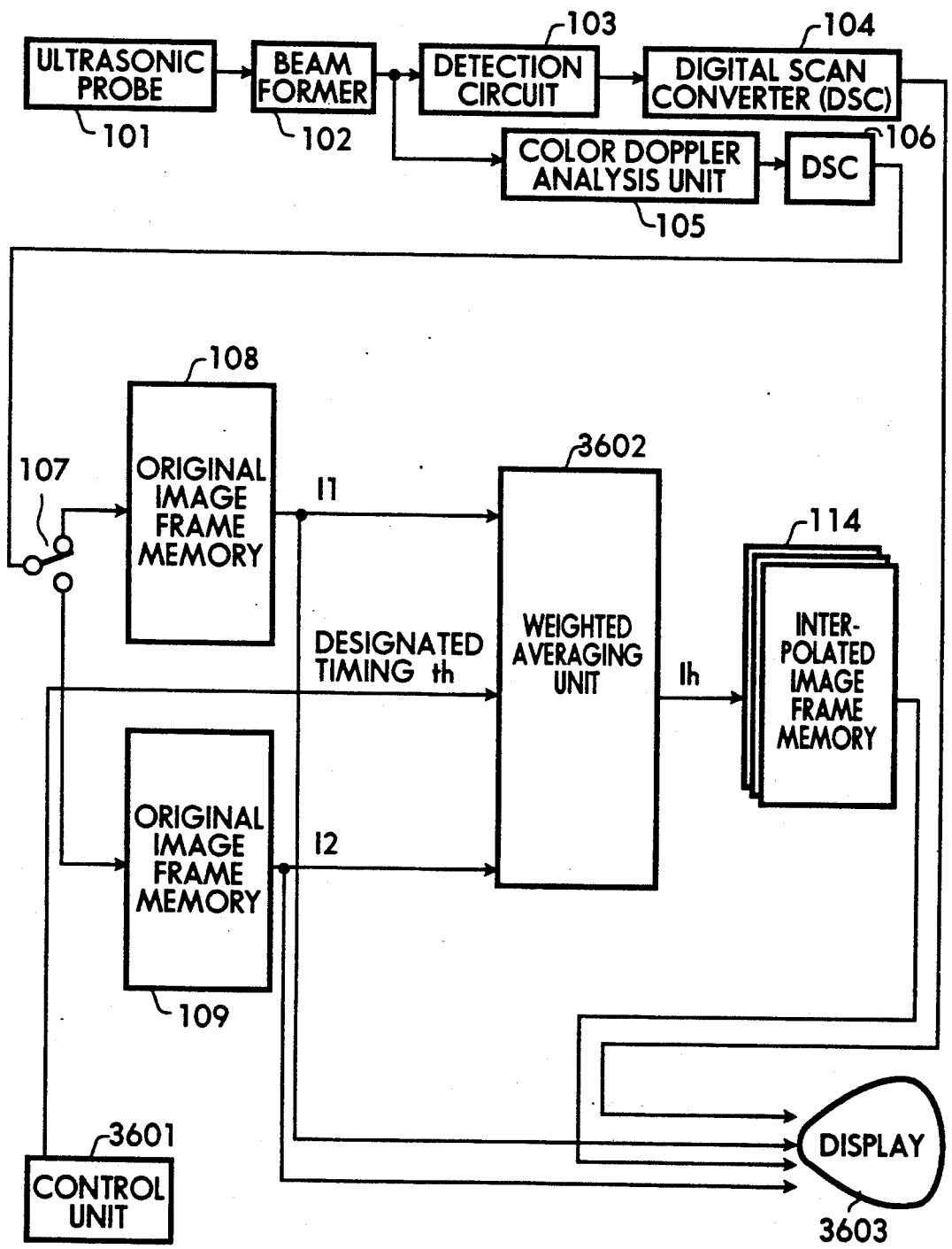

FIG. 36 shows the third conventional method. In the figure, components which are the same as in FIG. 32 are shown using the same reference numerals. Reference numeral 3601 is a control unit which outputs the timing th for performing the interpolation, and 3602 is a weighted averaging unit which performs weighted averaging on the original image data. Reference numeral 3603 is a display unit which displays the B mode images and the flow images. In this method, successive original images are recorded in a original image frame memory 108 and, from the two original images I1 and I2 obtained at the timings t1 and t2 recorded and shown in FIG. 37G for FIGS. 37A and 37E where the letters in parenthesis represent the FIGS. 37A-37F, interpolated images I (x, y) shown in FIGS. 37B, 37C, 37D at the designated timing th are calculated by the weighted averaging unit 3602 in accordance with the following equation:

$$I(x, y) = (1-w)I1(x, y) + w \cdot I2(x, y)$$

where, $$w = (th - t1)/(t2 - t1) \quad (1)$$

In this method, it is possible to improve the apparent ultrasonic frame rate simply and inexpensively.

When as shown in FIGS. 37A and 37E, the position and angle of the blood flow differ greatly among original images, however, as shown in FIGS. 37B, 37C, and 37D, a false blood flow completely different from the true images shown in FIGS. 33B, 33C, and 33D is displayed and there is the danger of mistaken diagnosis.

The object of the present invention is to improve the above three methods and to provide an apparatus which increases the apparent ultrasonic frame rate without the above defect. That is, the invention finds from the images of FIGS. 33A and 33E the natural interpolated images as shown in FIGS. 33B, 33C, and 33D and displays the same.

Figure 1:
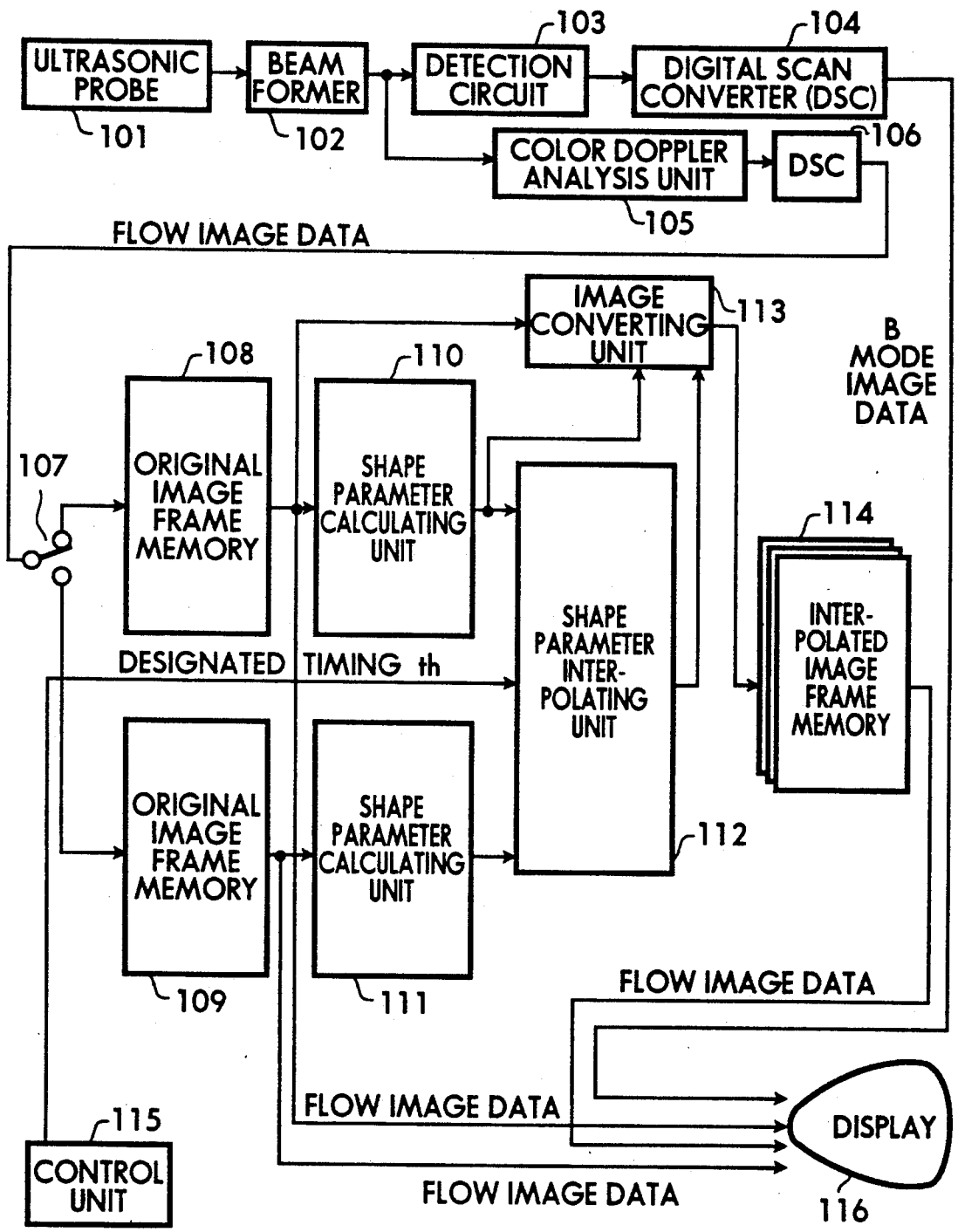
FIG. 1 is an explanatory view of the present invention.

FIG. 1 is an explanatory view of the present invention. In the figure, reference numeral 101 is an ultrasonic probe which sends and receives an ultrasonic wave, 102 is a beam former which forms an ultrasonic beam, and 103 is a wave detection circuit which detects the ultrasonic signal output from the beam former 102. In addition reference numeral 104 is a digital scan converter (DSC) which receives as input the detection signal and outputs a B mode image data, 105 is a color Doppler analysis unit which calculates the blood flow speed data from the ultrasonic signal, and 106 is a digital scan converter which converts the blood flow speed data to flow image data and outputs the same. Note that the transmitter 100 shown in FIG. 32 is omitted here only to simplify the drawing. Actually, the transmitter 100 is, of course, connected to the ultrasonic probe 101. Reference numeral 107 is a switch which switches the path of the flow image data, 108 and 109 are frame memories which record the original image data, and 110 and 111 are shape parameter calculating units which calculate the shape parameters relating to the shape of the blood flow regions. The shape perimeters are parameters characterizing the shape of the region where blood flows in the original image (hereinafter referred to as blood flow regions). In addition, numeral 112 is a shape parameter interpolating unit which interpolates the shape parameters and 113 is an image converting unit which uses the shape parameters and the interpolated shape parameters to perform an image conversion on original images and obtain the interpolated images. Further, numeral is an interpolated image frame memory which records the interpolated images, 115 is a control unit which gives a designated timing for calculation of the interpolated images to the shape parameter interpolating unit, and 116 is a displaying unit which displays the original images, interpolated images, and B mode images.

The ultrasonic color Doppler diagnostic apparatus according to the present invention, as shown in FIG. 1, is provided with shape parameter calculating units 110 and 111 which calculate the shape parameters of the original images, a shape parameter interpolating unit 112 which finds the shape parameters at any timing from the shape parameters of the original images, an image converting unit 113 which obtains interpolated images from the original images, and a displaying unit 116 which displays the interpolated images between the original images.

Since the blood flow in the heart changes direction and position with each instant, if simply interpolated by the third conventional method, a false blood flow will appear or be predicted, for example, a single blood flow may appear as two separate flows in the interpolated images, or other extremely unnatural images will be produced or generated. The central concept in the present invention is to calculate shape parameters so as to investigate how the blood flow moves, turns, expands and contracts in the successive original images and to perform image conversion from the original images based on the results or information obtained from the parameters to find interpolated images and thereby obtain natural or correct interpolated images.

According to the above construction, it is examined how the blood flow regions move, turn, expand, and contract with each original image and then interpolated images are created from the original images. The natural or correct interpolated images as shown in FIGS. 33B, 33C, and 33D are then obtained while holding or maintaining a high precision as compared with the original images and without any appearance of false blood flows. Thus it is possible to increase the apparent ultrasonic frame rate while displaying an accurate blood flow.

Figure 2:
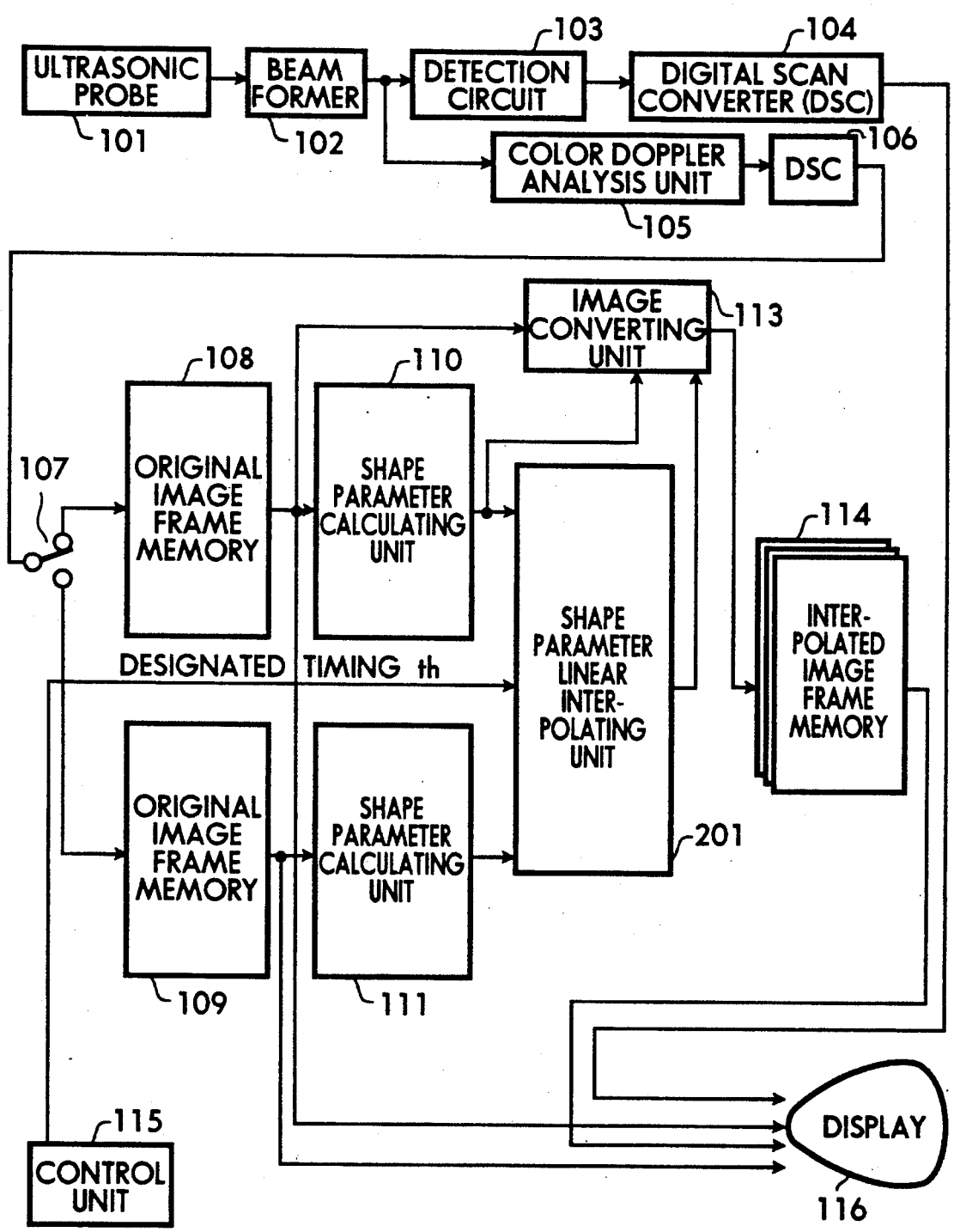
FIG. 2 is a constitutional view of a first embodiment of the present invention.
Figures 3A, 3B, 3C, 3D, 3E, 3F:
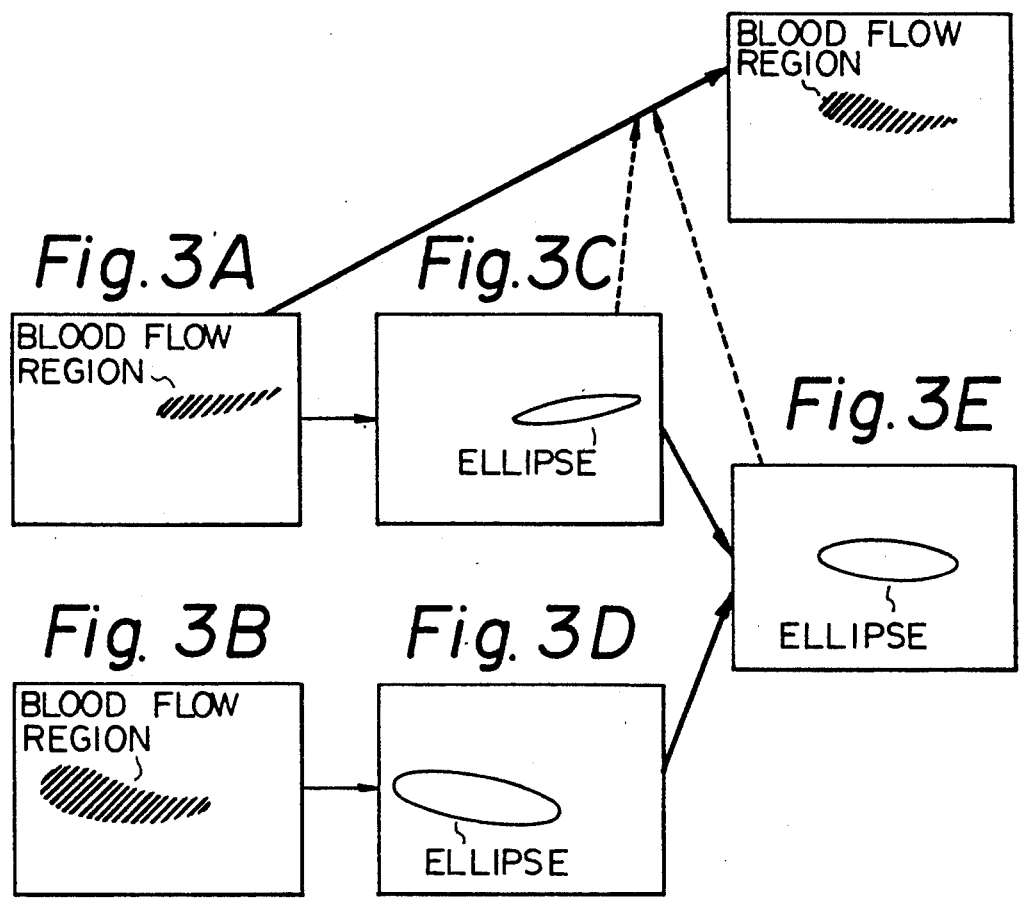

FIG. 2 shows a first embodiment of the present invention. In the figure, components the same as in FIG. 1 are shown by the same reference numerals. Reference numeral 201 is a shape parameter linear interpolating unit which performs linear interpolation on the shape parameters to produce the interpolated shape parameters. In this embodiment, ellipses are fit or placed as shown in FIGS. 3C and 3D on the blood flow regions on the original images of FIGS. 3A and 3B as physical images and it is determined how the latter change from the ellipses of FIG. 3C and FIG. 3D to the ellipse as in FIG. 3E. Based on this rule or procedure, an interpolated image shown in FIG. 3F is obtained from the original image shown in FIG. 3A to obtain an interpolated image which can express or represents a natural blood flow in a region.

The parameters necessary for expressing an ellipse are the coordinates of the center of the ellipse, the direction of the minor axis, the length of the major axis, and the length of the minor axis. These parameters correspond to the five shape parameters discussed below, that is, the x coordinate X of the center of gravity, the y coordinate Y of the center of gravity, the angle $\theta$ which the minor axis forms with the x axis, the inertia moment K about the minor axis, and the inertia moment L about the major axis. The work for fitting the ellipse means or requires these shape parameters to be found.

In the shape parameter calculating unit 110, the original image I1 (x, y) is read from the original image frame memory 108 and the values of the pixels are replaced by absolute values of the same. Then if the values of the pixels exceed a threshold level set in advance, the present values of the pixels are used, while if the pixels do not exceed the threaded value, the pixel values are replaced by 0, so as to obtain a value J1 (x, y) of a pixel of an image for calculation of the shape parameters. Hereinafter, the value of a pixel of an image is simply referred as an image. If it is assumed that $J = J1$, then the following arithmetic operations are performed so as to calculate the five shape parameters of the x coordinate X of the center of gravity, the y coordinate Y of the center of gravity, the angle $\theta$ which the minor axis forms with the x axis, the inertia moment K about the minor axis, and the inertia moment L about the major axis by the following equations:

$$X = Mx/M0$$
$$Y = My/M0$$
$$\theta = (1/2) \cdot \arctan(2 \cdot \mu xx/(\mu xx - \mu yy))$$
$$K = (1/2) \cdot ((\mu xx + \mu yy) + \sqrt{((\mu xx - \mu yy)^2 + 4\mu xy2))})$$
$$L = (1/2) \cdot ((\mu xx + \mu yy) - \sqrt{((\mu xx - \mu yy)^2 + 4\mu xy2))})$$

(2)

where,
$M0 = \int\int J(x, y)dxdy$ (area of J)

$Mx = \int\int xJ(x, y)dxdy$ (primary moment of J with respect to the x axis)
$My = \int\int yJ(x, y)dxdy$ (primary moment of J with respect to the y axis)
$\mu xx = \int\int (x-X) \cdot J(x, y)dxdy/M0$ $\mu yy = \int\int (y-Y) \cdot J(x, y)dxdy/M0$ (3)

Using these equations with the output of the shape parameter calculating unit 110, the five shape parameters of the shape parameters X1, Y1, $\theta$1, K1, and L1 of the original image (x, y) are obtained. On the other hand, the second original image I2 (x, y) is output from the original image frame memory 109. In the shape parameter calculating unit 111, the above-mentioned processing with regard to above parameters calculation unit 118 is performed to obtain the x coordinate X2 of the center of gravity, the y coordinate Y2 of the center of gravity, the angle $\theta$2 which the minor axis forms with the x axis, the inertia moment K2 about the minor axis, and the inertia moment L2 about the major axis.

These two sets of shape parameters from shape parameters calculating unit 110 and 111 are input to the shape parameter linear interpolating unit 201 to obtain the following interpolated shape parameters:

$$Xh = (1-w)X1 + w \cdot X2$$

$$Yh = (1-w)Y1 + w \cdot Y2$$

$$\theta h = (1-w)\theta 1 + w \cdot \theta 2$$

$$Kh = (1-w)K1 + w \cdot K2$$

$$Lh = (1-w)L1 + w \cdot L2$$

(4)

Figure 3G:
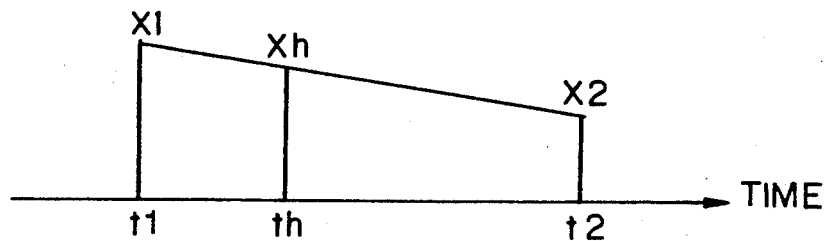

Where, w is the weight for obtaining the interpolated images. If the timing at which the original image I1 (x,y) is obtained is t1, the timing at which the original image I2 (x, y) is obtained is t2, and the timing at which the interpolated image is desired to be obtained is th, then the following arithmetic operation is performed:

$$w = (th - t1)/(t2 - t1)$$

and the range of $0 < w < 1$ is obtained. Here, illustrating the method of finding Xh, it is learned that a linear interpolation as shown in FIG. 3G is performed. Next, the shape parameters X1, Y1, $\theta$1, K1, and L1 and the shape parameters of the interpolated image at the designated timing, that is, the interpolated shape parameters Xh, Yh, $\theta$h, Kh, and Lh are input to the image converting unit 113 and the interpolated image Ih1 (x, y) is calculated from the original image I1 (x, y). In the image converting unit 113, affine conversion, explained later, is performed. Affine conversion itself is a well known image conversion technique and involves linear computation of three conversions, i.e., a parallel movement, a rotation, and an elongation or contraction. Here, if the conversion for parallel movement is T (X, Y), the conversion for rotation about the origin by exactly an angle $\theta$ is R ($\theta$), and the conversion for expansion or contraction K times in the x axial direction and L times in the y axial direction is S (K, L). Using this information, the coordinates of pixels of the original image I1 (x, y) and the corresponds pixels Ih (xh, yh) of the interpolated image can be computed by the following equation:

$$\begin{bmatrix} x \\ y \\ 1 \end{bmatrix} = G(X1, Y1, \theta 1, K1, L1, Xh, Yh, \theta h, Kh, Lh) \begin{bmatrix} xh \\ yh \\ 1 \end{bmatrix}$$

(6)

where, G(X1, Y1, $\theta$1, K1, L1, Xh, Yh, $\theta$h, Kh, Lh) = T(X1, Y1) R ($\theta$1).

$$S(K1, L1)R(-\theta 1) \cdot R(\theta h)S(-Kh, -Lh) \cdot R(-\theta h)T(-Xh, -Yh) \quad (7)$$

R($-\theta$h)T ($-$Xh, $-$Yh)
Here, T, R and S are as follows:

$$T(X, Y) = \begin{bmatrix} 1, & 0, & X \\ 0, & 1, & Y \\ 0, & 0, & 1 \end{bmatrix} \quad (8)$$

$$R(X, Y) = \begin{bmatrix} \cos(\theta), & \sin(\theta), & 0 \\ -\sin(\theta), & \cos(\theta), & 0 \\ 0, & 0, & 1 \end{bmatrix}$$

$$S(K, L) = \begin{bmatrix} K, & 0, & 0 \\ 0, & L, & 0 \\ 0, & 0, & 1 \end{bmatrix}$$

Figure 5A:
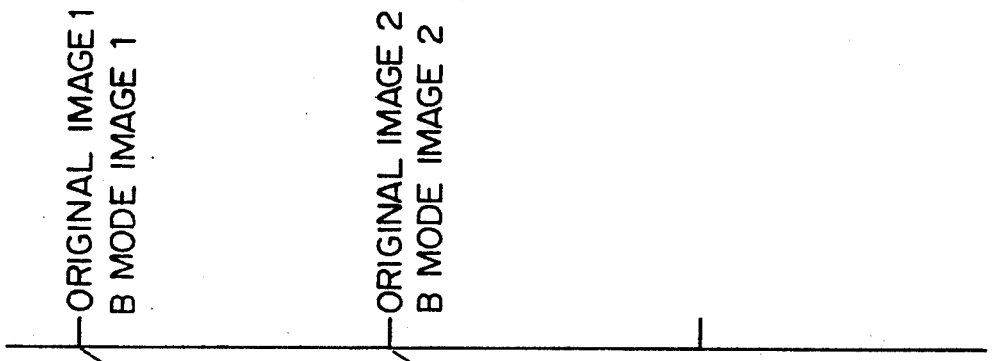
Figure 5B:
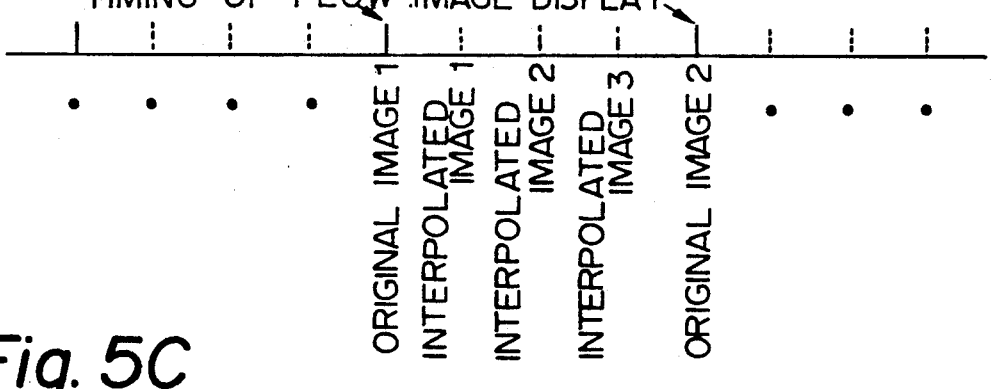
Figure 5C:
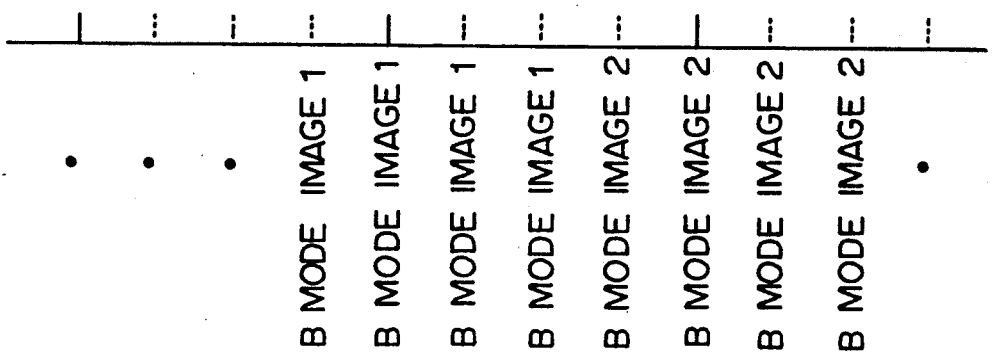
Figure 6:
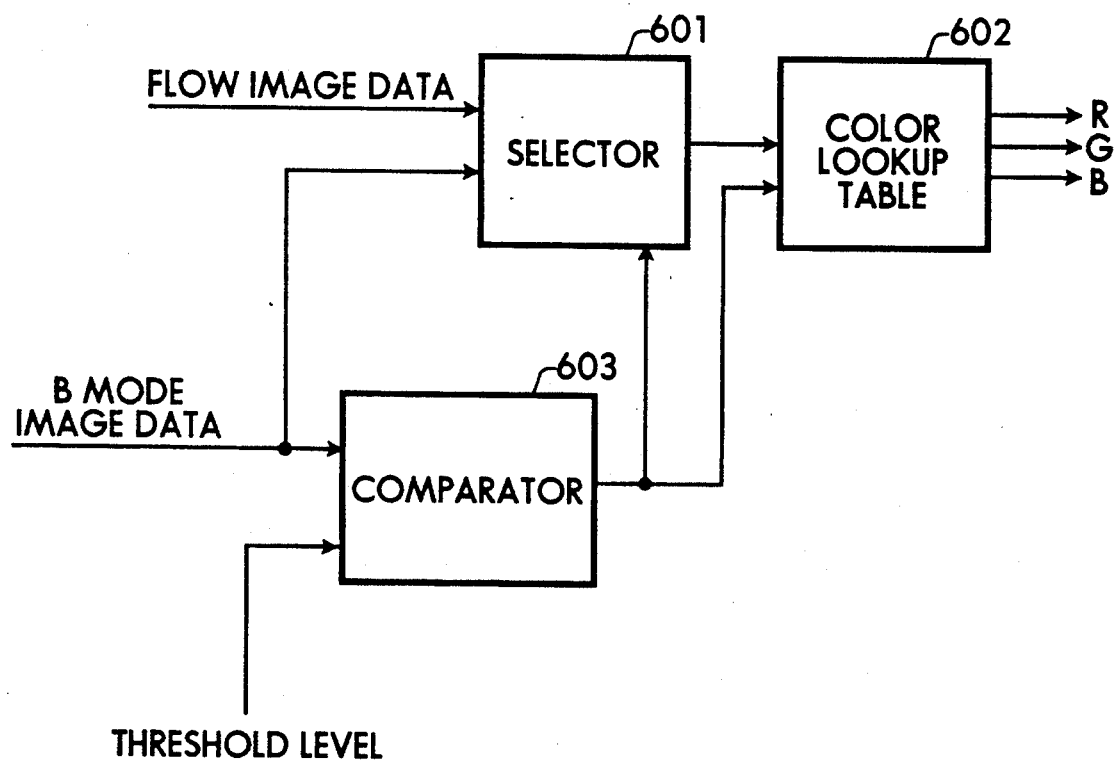

From this, it is possible to create an interpolated image by making the value Ih (xh, yh) of the pixel on the coordinates (xh, yh) of the interpolated image shown in FIG. 4B the value Il (x, y) of the pixel on the coordinates (x, y) of the original image shown in FIG. 4A. The x, y coordinates found in this way are not necessarily precisely at the center of the pixels of or occupy the same rotations are the original image. However, as shown in FIG. 4A it is possible to deal with this fact by using the value I (i, j) of the pixel closest to the coordinate (x, y) or by interpolating from the surrounding four pixels (i−1, j), (i−1, j 1), (i, j), (i, j +1). Further, when writing in the interpolated image to the interpolated image frame memory 114 and, for example, obtaining three frames of interpolated images with respect to a pair of original images shown in FIG. 5A, a display may be made by the displaying unit 116 at the timing shown in FIG. 5B. The B (brightness) mode image is the image of a muscle. Note that the interpolation is not effected on the B mode images as shown in FIG. 5C because the rate changes of of the B mode image is very low in comparison with the flow rate of the blood. The original image, the interpolated image, or the B mode image is displayed on the display unit 116. FIG. 6 shows an embodiment of the display unit.

In FIG. 6, 601 is a selector which selects and outputs of either the flow image data or the B mode image data, and 602 is a color lookup table (LUT) which converts the signal input to the color lookup table 602 into an RGB signal and outputs the same. In addition, numeral 603 is a comparator which compares the B mode image data and the threshold level and outputs a logical level signal in accordance with the result of the comparison.

As shown in FIG. 6, if the data of the B mode image is higher than a threshold level determined in advance, then the B mode image data appears at the output of the selector 601. When this is not the case, the flow image data appears. Together with the image data, an RGB signal is output while switching the COLOR LUT. Therefore, the B mode image is displayed at portions where the luminance of the B mode image is high, and otherwise the flow image is displayed. In the above explanation, the original images and interpolated images were displayed, but it is also possible to find the interpolated images at timings of equal intervals, leave out or omit the original images from the display, and display only the interpolated images.

Figure 7:
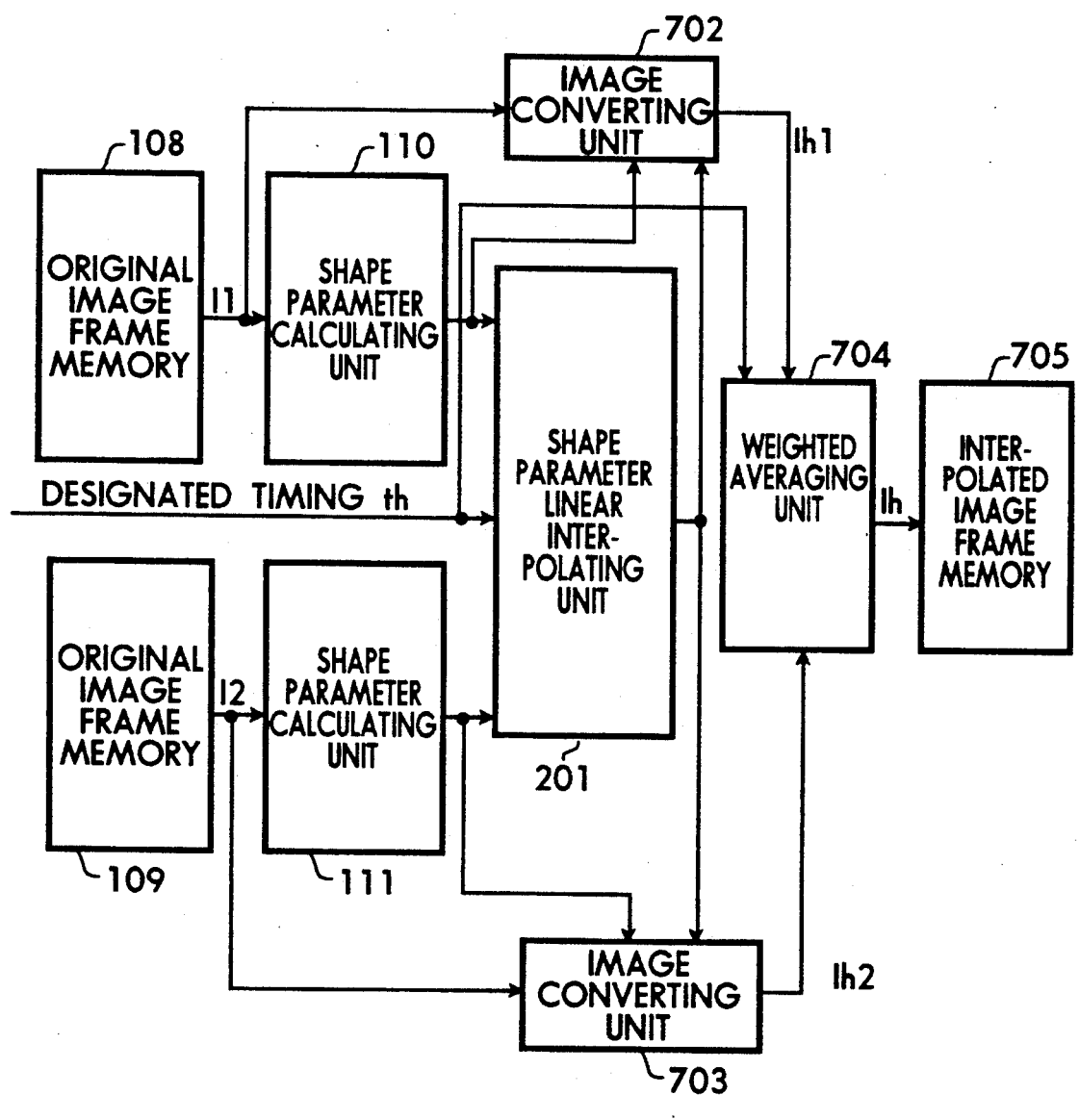
FIG. 7 is a constitutional view of a second embodiment of the present invention.

FIG. 7 shows a second embodiment. In the figure, components which are the same as in FIG. 1 are shown by the same reference numerals. In the figure, reference numerals 702 and 703 are image converting means or units, which use the shape parameters and the interpolated shape parameters and perform image conversion on the original images to obtain the converted images. Reference numeral 704 is a weighted averaging unit, which obtains or generates the weighted average of two converted images in accordance with a designated timing th to obtain an interpolated image. Reference numeral 705 is an interpolated image frame memory which records the interpolated images.

In this embodiment, the object is to obtain a higher precision interpolated image than produced in the first embodiment by performing image conversion not only from the original image I1 (x, y), but also from the original image I2 (x, y). The weighted average of the two resulted converted images is performed to obtain a single interpolated image.

As in the first embodiment, the shape parameters X2, Y2, $\theta$2, K2, and L2 and the interpolated shape parameters Xh, Yh, $\theta$h, Kh, and Lh are input to the image conversion circuit 703, and the interpolated image Ih2 (xh, yh) is calculated from the original image I2 (x, y). The interpolated images Ih1 (xh, yh) and Ih2 (xh, yh) obtained in this way are input to the weighted averaging means 704, where the weighted average of the pixels of the two interpolated images is output as Ih (xy, yh)

$$= (1-w)Ihl(xh, yh) + w \cdot Ih2 (xh, yh) \quad (9)$$

to obtain the desired interpolated image.

The shape parameter calculating units 110 and 111, the shape parameter linear interpolating unit 201, the image converting units 702 and 703, and the weighted averaging unit 704 may be easily constructed using a multiplier, adder, divider, etc. so as to operate as in the equations disclosed above. Further, when use is made of an MPU (more processing unit) which can operate at a sufficiently fast speed, it is possible to realize the functions of the circuits by using software. Also, it is possible to successively process a plurality of images by a single circuit having the same functions such as the image converting units 702 and 703.

Figure 8:
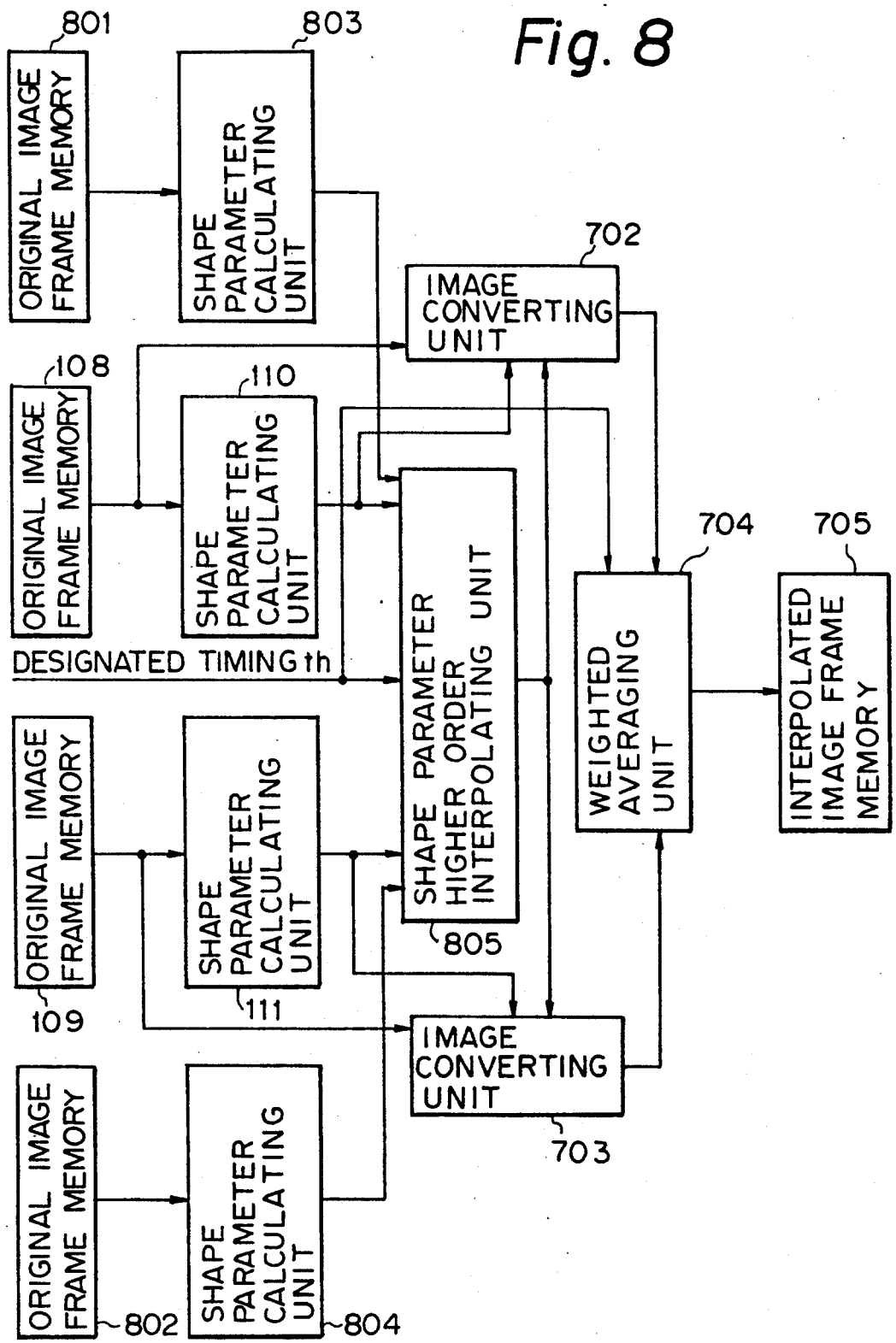
FIG. 8 is a constitutional view of a third embodiment of the present invention.

FIG. 8 is a view showing a third embodiment. In FIG. 8, components the same as those in FIG. 7 are shown by using the same reference numerals. In the FIG, reference numerals 801 and 802 are original image frame memories which record the original images, and 803 and 804 are shape parameter calculating units which calculate the shape parameters showing the shapes of the blood flow regions. In addition, 805 is a shape parameter higher order interpolating unit which performs high order interpolation on the shape parameters to obtain the interpolated shape parameters. In this embodiment, the object is to obtain a more natural interpolated image by performing high order interpolation on portions of the interpolated image where the shape parameters were calculated by using a linear interpolation in the second embodiment.

Figure 9:
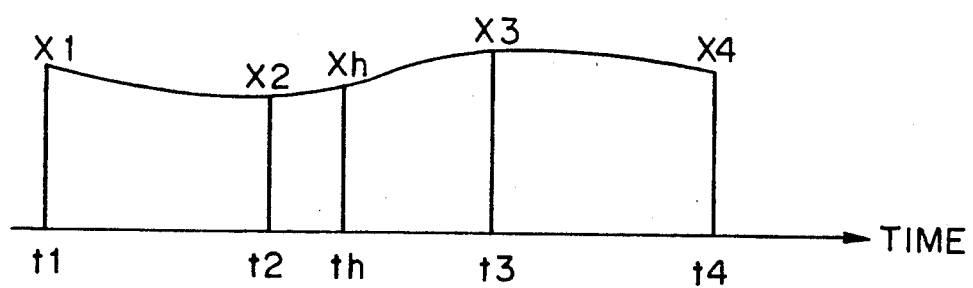
FIG. 9 is an explanatory view of the principle of the third embodiment.

The operation of this third embodiment is very close to the operation of FIG. 7, so the explanation will focus on the main points which is the use of three or more sets of shape parameters. Here, the explanation will be made of the case or example when using four sets of shape parameters. Making the explanation with reference to the X coordinate of the center of gravity position in the shape parameters, four x coordinates X1, X2, X3, and X4 of the center of gravity position are obtained, corresponding to the timings t1, t2, t3, and t4 where the original images were obtained, as shown in FIG. 9. Next, a third-ordered function passing through all these points is sought.

The shape parameter high order interpolating means or unit 805 determines the coefficients a, b, c, and d of the third-ordered function in accordance with the next equation and uses the interpolation timing parameter w designated to output the interpolated value Xh:

$$Xh = a \cdot th^3 + b \cdot th^2 + c \cdot th + d \qquad (10)$$

$$\begin{bmatrix} a \\ b \\ c \\ d \end{bmatrix} = \begin{bmatrix} t1^3, & t1^2, & t1, & 1 \\ t2^3, & t2^2, & t2, & 1 \\ t3^3, & t3^2, & t3, & 1 \\ t4^3, & t4^2, & t4, & 1 \end{bmatrix}^{-1} \begin{bmatrix} X1 \\ X2 \\ X3 \\ X4 \end{bmatrix}$$

The other image display parameters Yh, $\theta$h, Kh, and Lh are calculated based on the same calculations in equation using Y1, $\theta$1, K1, L1, Y2, $\theta$2, K2, and L2. Thus, span when using N sets of shape parameters, it is easy to find the coefficients of the N−1 order function and find the interpolated shape parameters.

Figure 10:
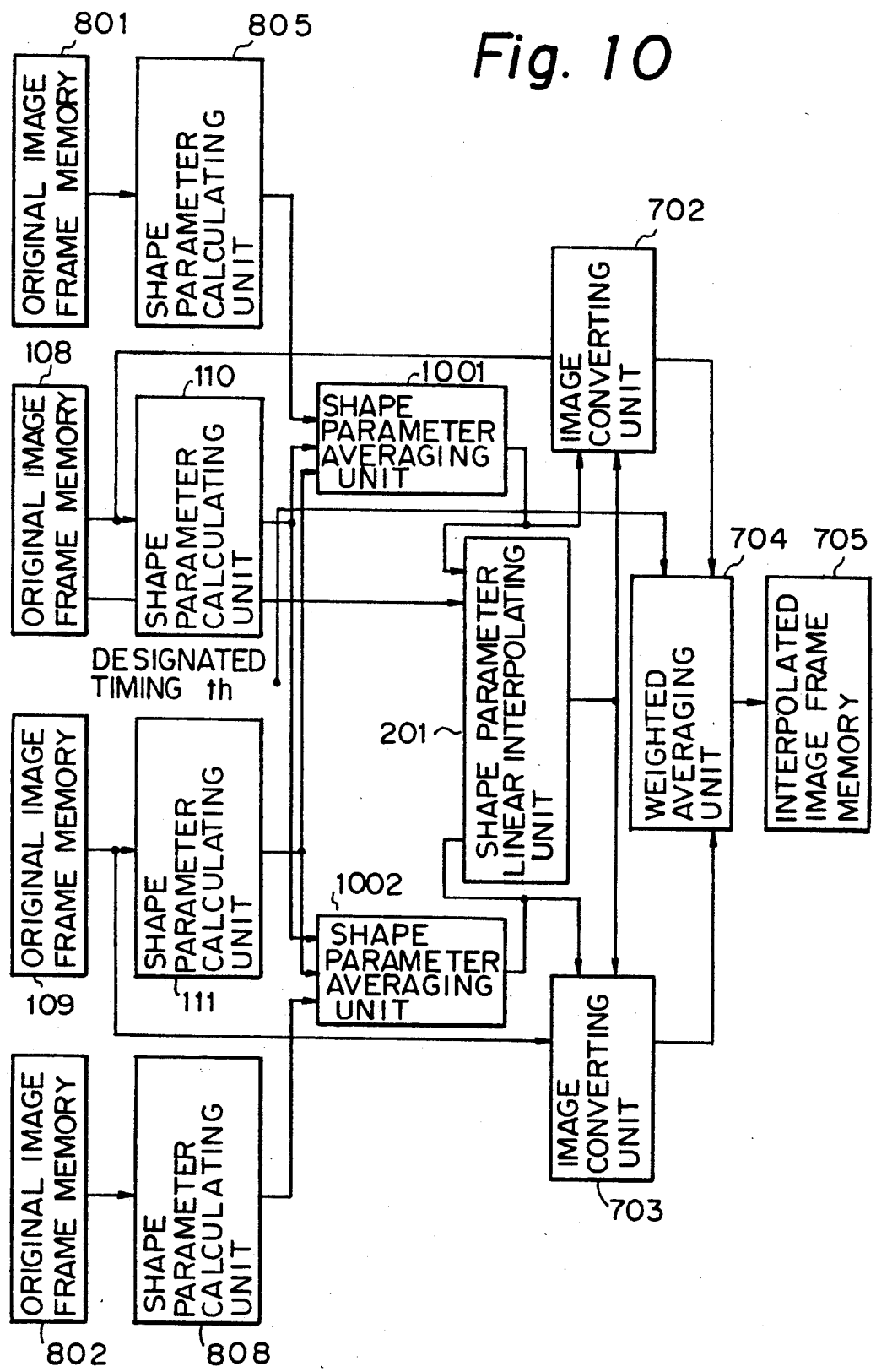
FIG. 10 is a constitutional view of a fourth embodiment of the present invention.

FIG. 10 is a view explaining a fourth embodiment. In the figure, components the same as in FIG. 2 and FIG. 8 are shown by the same reference numerals. Reference numerals 1001 and 1002 are shape parameter averaging units, which obtain the average of the plurality of shape parameters.

Figure 11A:
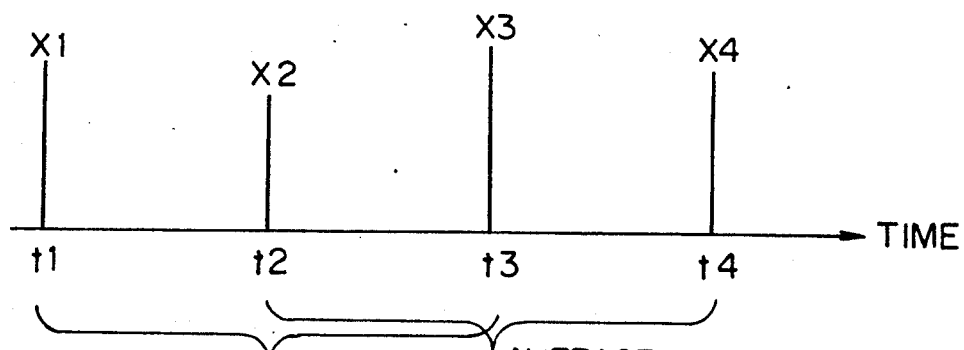
FIGS. 11A and 11B are explanatory views of the principle of the fourth embodiment.
Figure 11B:
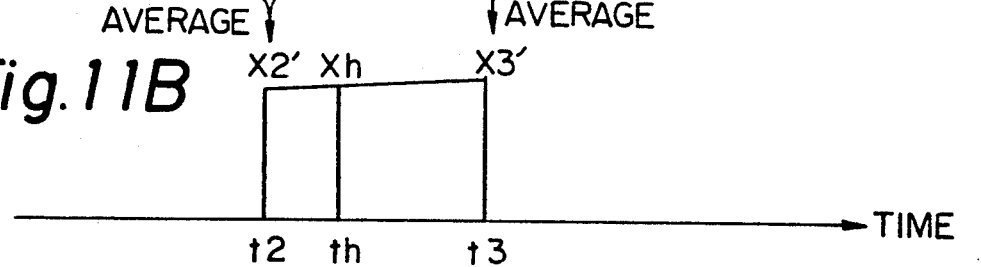

In the embodiment, as shown in FIG. 10, the object is to obtain a more stable interpolated image by creating an interpolated image using average shape parameters obtained by averaging the shape parameters of a plurality of frames when image conversion is performed. For example, for the X coordinate of the center of gravity, as shown in FIGS. 11A and 11B, X1, X2, and X3 among the X1, X2, X3, and X4 obtained corresponding to the timings t1, t2, t3, and t4 are used to obtain an average X2' by the shape parameter averaging unit 1001. In addition, X2, X3, and X4 are used to obtain another average X3' by the shape parameter averaging unit 1002, and these average shape parameters are used to obtain the interpolated shape parameters by using, for example, the shape parameter linear interpolating unit 201.

Figure 12:
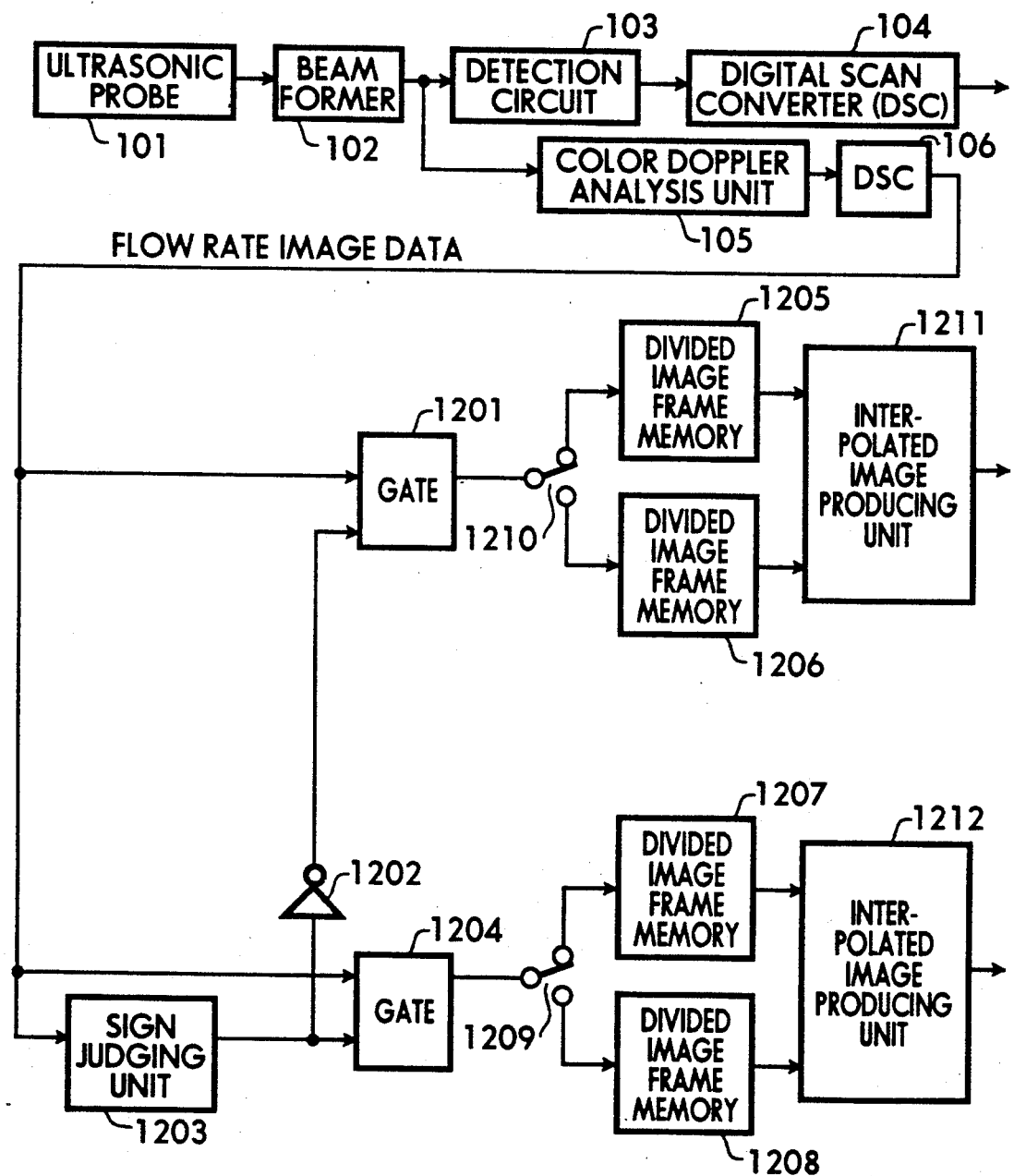
FIG. 12 is a constitutional view of a fifth embodiment of the present invention.

FIG. 12 shows a fifth embodiment. In FIG. 12, the components the same as in FIG. 1 are shown by the same reference numerals.

In the FIG., 1201 and 1204 are gate circuits which control the flow image data from the digital scan converter (DSC) of the previous stage to obtain a divided image, and 1203 is a sign judging unit which judges or determines the sign of the flow image data from the digital scan converter 106 of the previous stage and outputs the judged sign as a logical level signal. Reference numeral 1202 is an inverter for inverting the signal output from the sign juding unit 1203. The inverted signal is then sent to Gate 1201. Reference numerals 1209 and 1210 are switches which switch the flow image data output from the gate circuit 1201 or the gate circuit 1204 with each frame, and 1205 to 1208 are divided image frame memories which record the divided images.

Reference numerals 1211 and 1212 are interpolated image producing units which are comprised of the shape parameter calculating units 110 and 111, the shape parameter interpolating unit 112, and the image converting unit 113 shown in FIG. 1 and which produce interpolated images from the divided images.

Figure 13A:
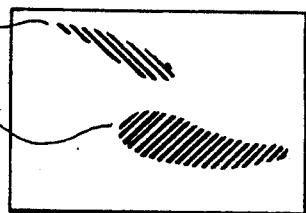
FIGS. 13A, 13B, 13C, 13D, 13E and 13F are explanatory views of the principle of the fifth embodiment of the present invention.
Figure 13B:
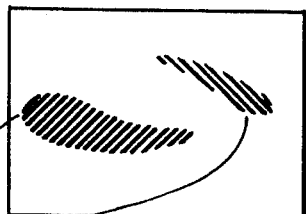

In this fifth embodiment, a flow image comprised of a mixture of a first blood flow in a region with a positive average flow rate, which means a blood flow approaching the ultrasonic probe 101, and a second blood flow was region with a negative average flow rate, which means a blood flow going away from the ultrasonic probe 101, as shown in FIG. 13A, are handled or treated as separate images as shown in FIGS. 13C, 13D, 13E, and 13F. This separate treatment is based on whether the pixel values of the flow image are positive or negative, thus enabling a separate interpolation of the inherently independently flowing blood and further, this fifth embodiment it is expected, to obtain a more natural or correct interpolated image.

Figure 13C:
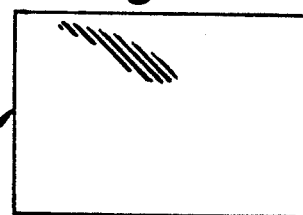
Figure 13D:
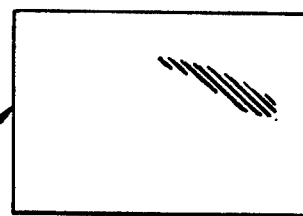
Figure 13E:
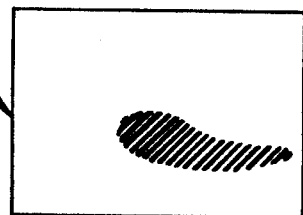
Figure 13F:
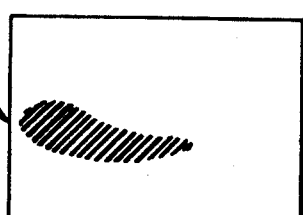
Figure 14:
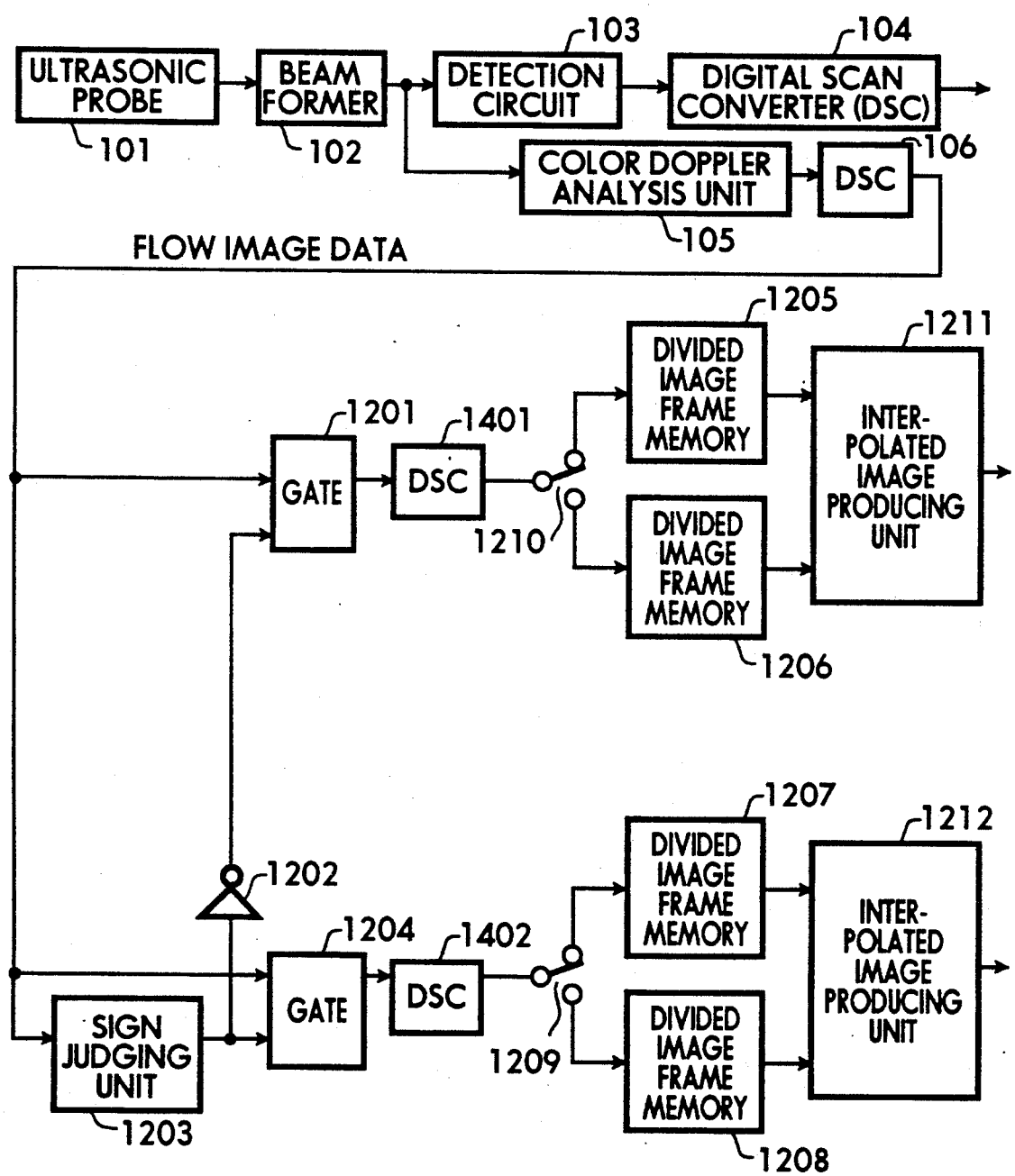
FIG. 14 is a view explaining another example of the constitution of the fifth embodiment.

Is the fifth embodiment, the value of the pixels of the flow image is first judged to be positive or negative by the sign judging unit 1203. If positive, the logical level "1", for example, is output and if negative, the logical level "0", for example, is output. By controlling the gate 1201 and the gate 1204 by the output of the sign judging unit 1203, the blood flow in a region with the negative average flow rate is recorded in the divided image frame memory 1205 as shown in FIG. 13C, while the blood flow in a region with the positive average flow rate is recorded in the divided image memory 1207 as shown in FIG. 13E. In the next frame, the switches 1210 and 1209 are operated, whereby the blood flow in a region with the negative average flow rate is recorded in the divided image frame memory 1206 as shown in FIG. 13D, while the blood flow region with the positive average flow rate is recorded in the divided frame memory 1208 as shown in FIG. 13F of the figure. The outputs of the divided image frame memories 1205, 1206, 1207, and 1208 recorded in this way are input to the interpolated image producing units 1211 and 1212. It is then possible to separately obtain an interpolated image of the blood flow region with the positive average flow rate and the interpolated image of the blood flow region with the negative average flow rate, and therefore to obtain a more natural image. Further, as shown in FIG. 14, the blood flow speed data of the output of the color Doppler analysis unit 105 may be separated and after separation passed through the DSC's (digital scan converters) 1401 and 1402 to be recorded in the divided image frame memories 1205 and 1207 or 1206 and 1208.

Figure 15:
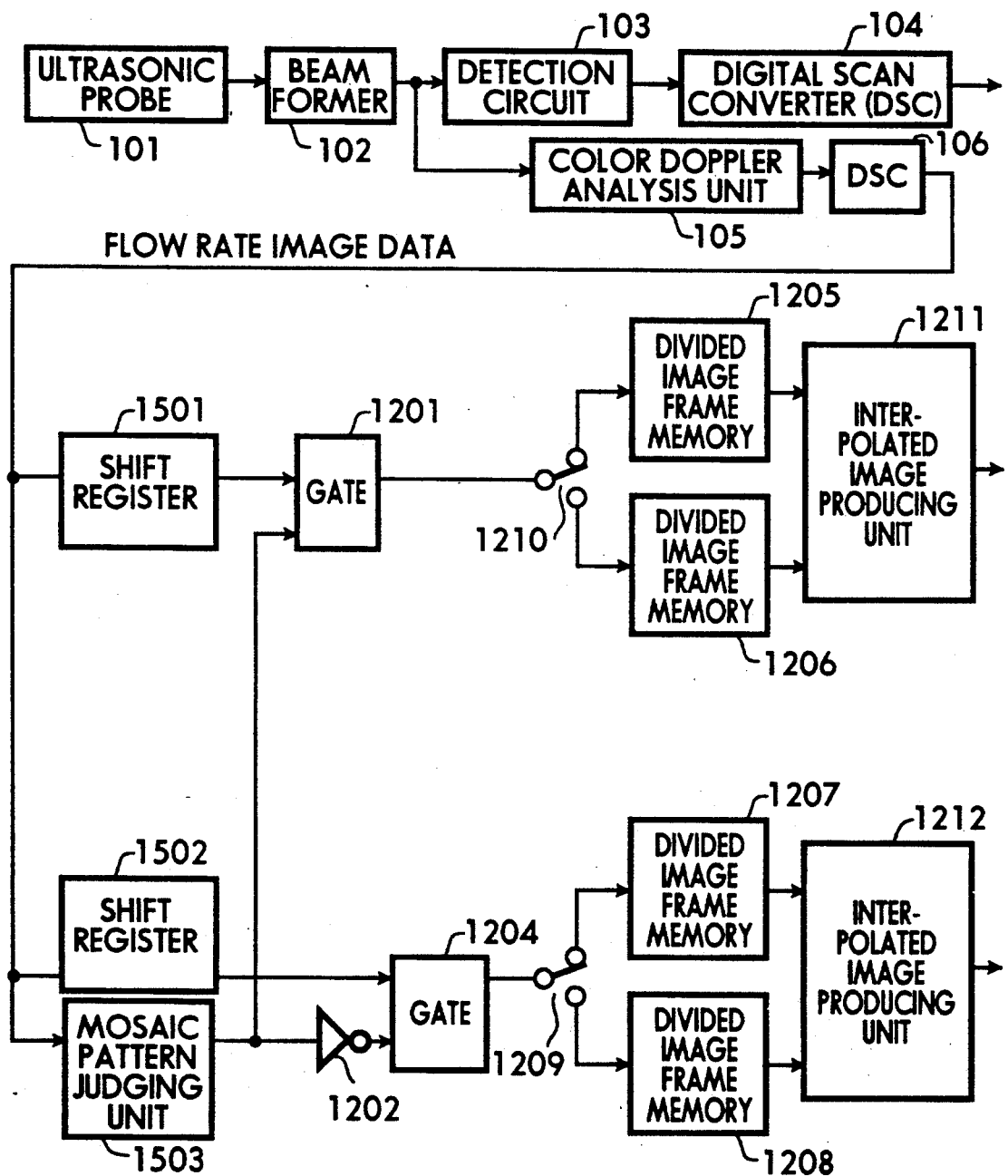
FIG. 15 and FIG. 16 are constitutional views of the sixth embodiment of the present invention.

FIG. 15 shows a sixth embodiment. In the figure, the components which are the same as those in FIG. 12 are shown by the same reference numerals. Reference numeral 1503 is a mosaic pattern judging unit, which judges or determiners if the area surrounding a particular pixel in the flow image forms a mosaic pattern, and 1501 and 1502 are shift registers which give a delay of the processing time of the mosaic pattern judging unit 1503.

In this sixth embodiment, a mosaic pattern observed in a so-called jet stream or the like is a special blood flow pattern wherein red portions showing the positive average flow rate and blue portions showing the negative average flow rate appear at random for each pixel. The mosaic pattern is formed when the blood flow is disordered. The mosaic pattern is also formed when the sampling rate is not equal to or greater than twice the highest significant component of the flow rate of the blood, according to the sampling theory. The object is to raise the reliability of diagnosis by extracting the blood flow regions showing a mosaic pattern and finding the interpolated images using these mosaic cutters. The values of the pixels of the flow image are first judged to be mosaic or not by the mosaic pattern judging unit 1503. If the pixels are judged as a mosaic, the logical level "1", for example, is output, and if not determined mosaic the logical level "0", for example, is output.

Figure 16:
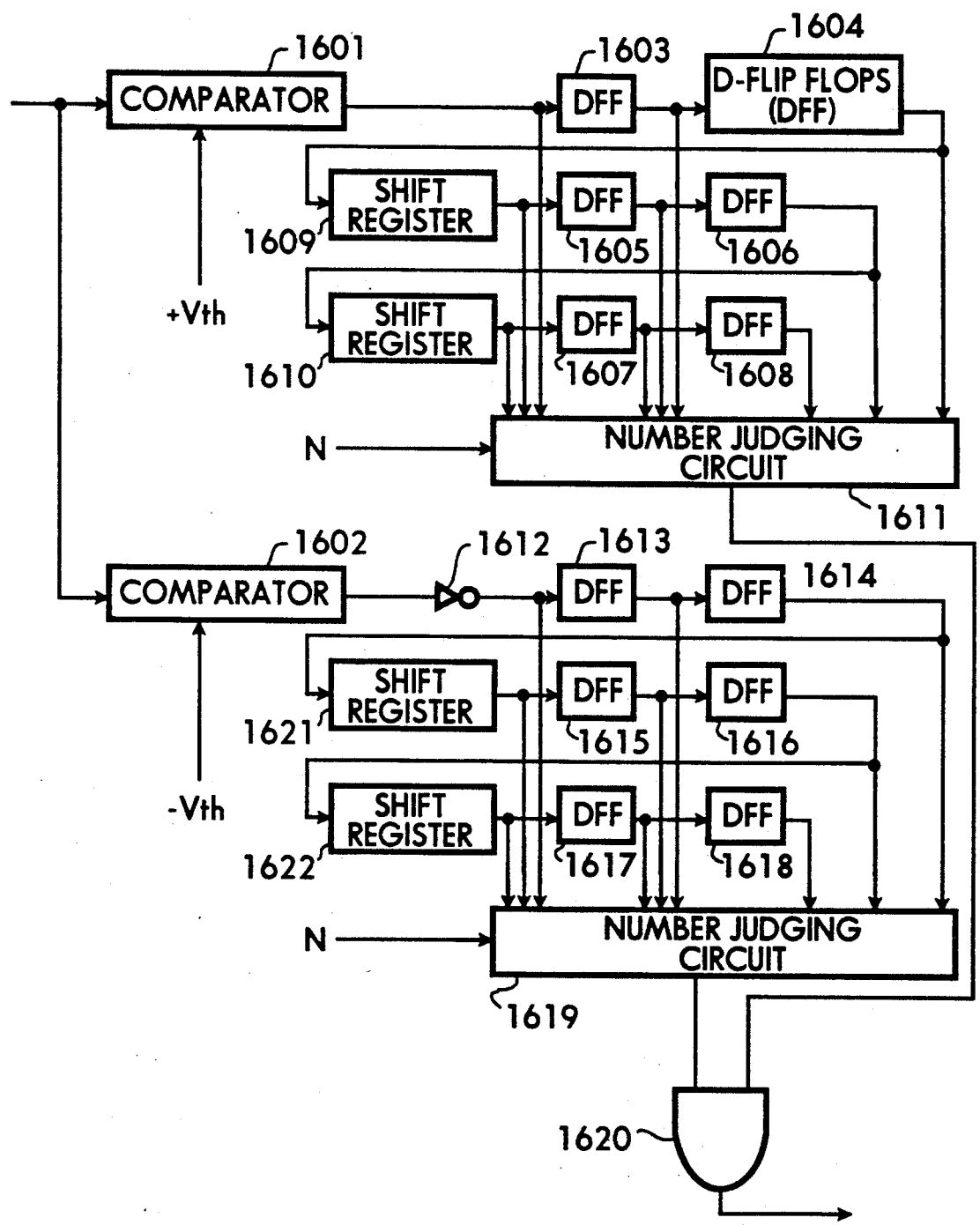
Figure 17:
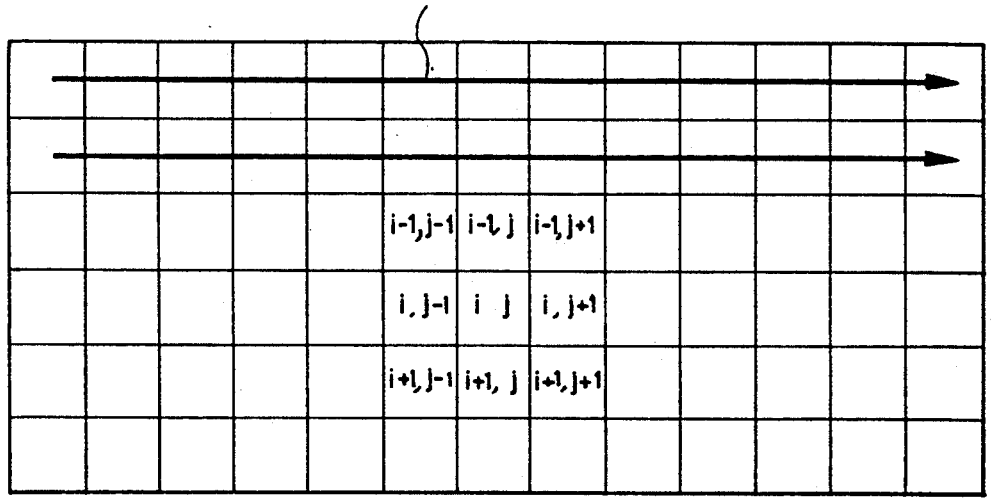
FIG. 17 and FIGS. 18A, 18B, 18C, 18D, 18E and 18F are explanatory views of the principle of the sixth embodiment.

FIG. 16 shows details of the mosaic pattern judging unit 1503. In the figure, 1601 and 1602 are comparators which compare the input signals of flow image data with +Vth or -Vth and output the results as logical level signals, and 1603 to 1608 and 1613 to 1618 are D-flipflops (DFF) each of which gives a delay of one pixel worth of data. Reference numerals 1609, 1610, 1621, and 1622 are shift registers each of which gives a delay corresponding to one scanning line, 1611 and 1619 are number judging circuits each of which judges if the number of signal lines with logical levels of "1" input from the previous stage is larger than a defined value N, 1612 is an invertor, and 1620 is an AND gate. The mosaic pattern judging unit 1503, as shown in FIG. 16, outputs a logical level "1; " (hereinafter referred to as true) if the value of the pixel is more than +Vth according to the comparator 1601 and outputs a logical level "0" (hereinafter referred to as false) if not. It extracts the results of comparison of the pixel (i, j) of FIG. 17 and the surrounding eight pixels by the shift registers 1609 and 1610 and the DFF,s 1603 to 1608. If, by the number judging circuit 1611, the number of pixels with logical levels true is larger than a number N set in advance, then it outputs a logical level true while if not it outputs a logical level false. The output logical level shows if the pixels of a positive average flow rate are more numerous than a defined number. The number judging circuit 1611 can be easily constructed by using random logic circit and can be replaced by a ROM. Similarly, if, by the comparator 1602 and the invertor 1612, the pixel is lower than −Vth, it outputs a logical level true and if not outputs a logical level false. It extracts the results of comparison of the pixel (i, j) and the surrounding eight pixels by the shift registers 1621 and 1622 and the DFF's 1613 to 1618. If, by the number judging circuit 1619, the number of pixels of a logical level true is larger than a number N previously set, it outputs a logical level true and if not, outputs a logical level false. The output logical level shows if the pixels with a negative flow rate are more numerous than a defined number.

The logical product of the output of the number judging circuits 1611 and 1619 is obtained by the AND gate 1620 and if a mosaic pattern, a logical level true is output. If not, a logical level false is output.

Figure 18A:
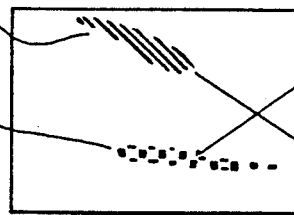
Figure 18B:
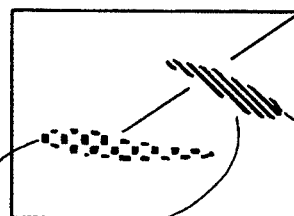
Figure 18C:
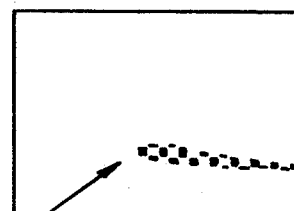
Figure 18D:
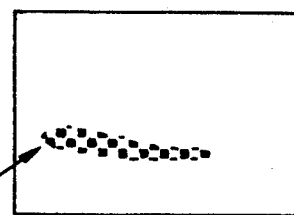
Figure 18E:
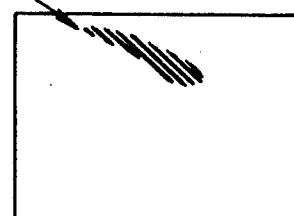
Figure 18F:
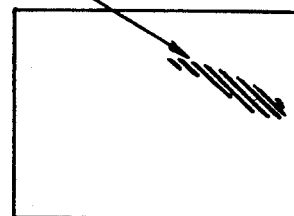

The gate 1201 and gate 1204 of FIG. 15 are controlled by the output of the mosaic pattern judging unit 1503, whereby the normal blood flow region is recorded in the divided image frame memory 1207 as shown in FIG. 18E, and the blood flow region with the mosaic pattern is recorded in the divided image frame memory 1205 as shown in FIG. 18C. In the next frame, the switches 1210 and 1209 are switched, whereby the normal blood flow region is recorded in the divided image frame memory 1208 as shown in FIG. 18F, and the mosaic pattern blood flow region is recorded in the divided image frame memory 1206 as shown in FIG. 18D. The outputs of the divided image frame memories 1205, 1206, 1207, and 1208 thus recorded are input to the interpolated image producing units 1211 and 1212 to obtain an interpolated image. This procedure makes it possible to separately obtain an interpolated image of the mosaic pattern blood flow region and an interpolated image of the normal blood flow region, and thus a more natural image can be obtained.

In this sixth embodiment, the judgment or determination was made on a particularly noted pixel and the surrounding eight pixels, but in working this embodiment, it is possible also to suitably select the number of the D-flipflops (DFF's) so as to select the appropriate range of pixels.

Figure 19:
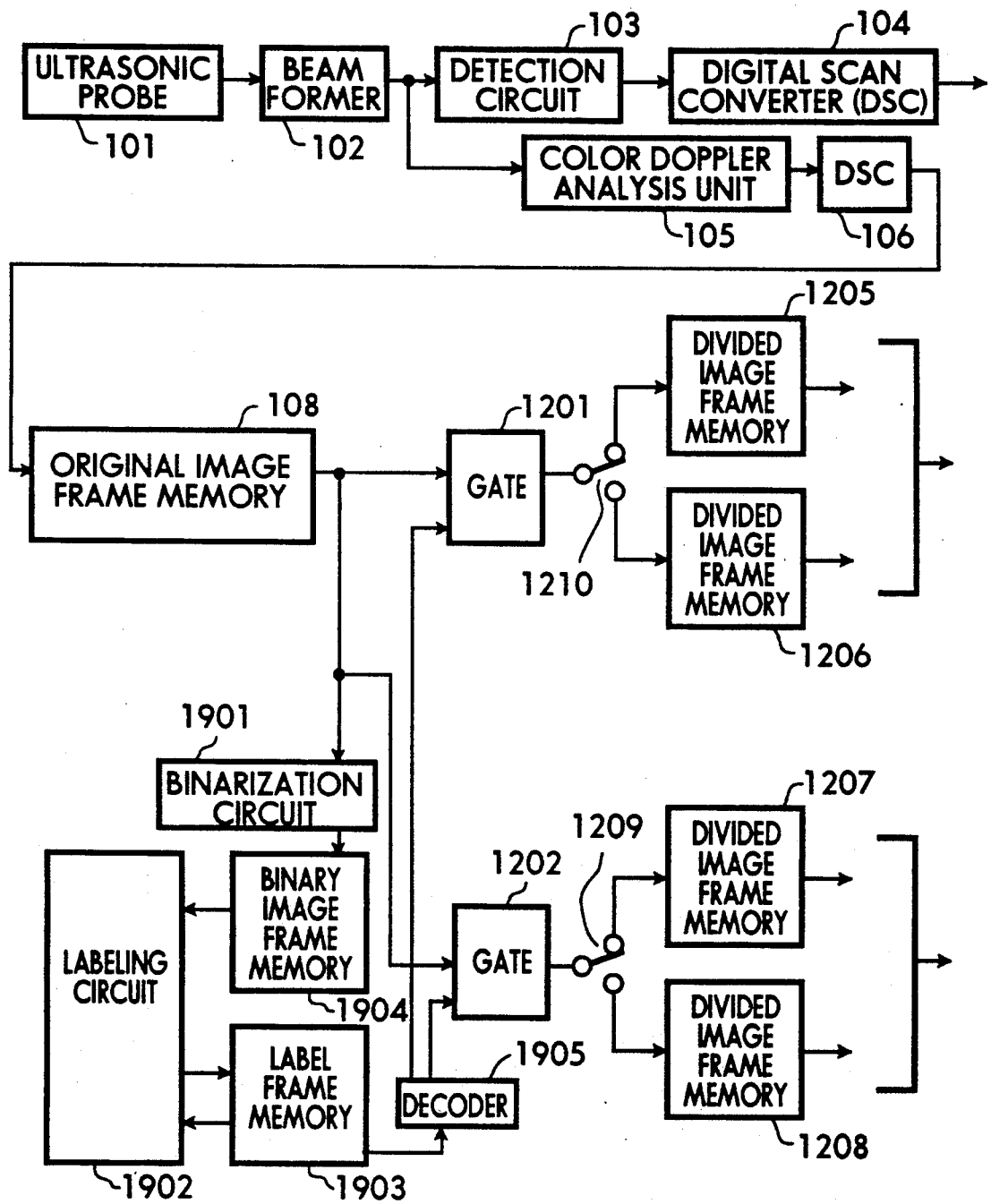
FIG. 19 is a constitutional view of the seventh embodiment of the present invention.

FIG. 19 shows a seventh embodiment. In FIG. 19 components which are the same as in FIG. 12 are shown by the same reference numerals. In addition reference numeral 1901 is a binarization circuit which obtains a binary image from an original image, 1904 is a binary image frame memory which records binary images, and 1902 is a labeling circuit which gives unique label values to blood flow regions existing independently two dimensionally. Further, numeral 1903 is a label frame memory which records the labels, and 1905 is a decoder which makes just one of the lines a logical level true in accordance with the labeling values of the pixels Even with blood flow regions with the same blood flow speed data characteristics, it is irrational to create an interpolated image by deeming or considering as one blood flow, for example, two blood flows flowing in the same direction simultaneously to the left ventricle and the right ventricle. In this seventh embodiment, the object is to treat as separate the blood flow regions which are clearly separate two dimensionally so as to obtain a natural interpolated image.

Figure 21E:
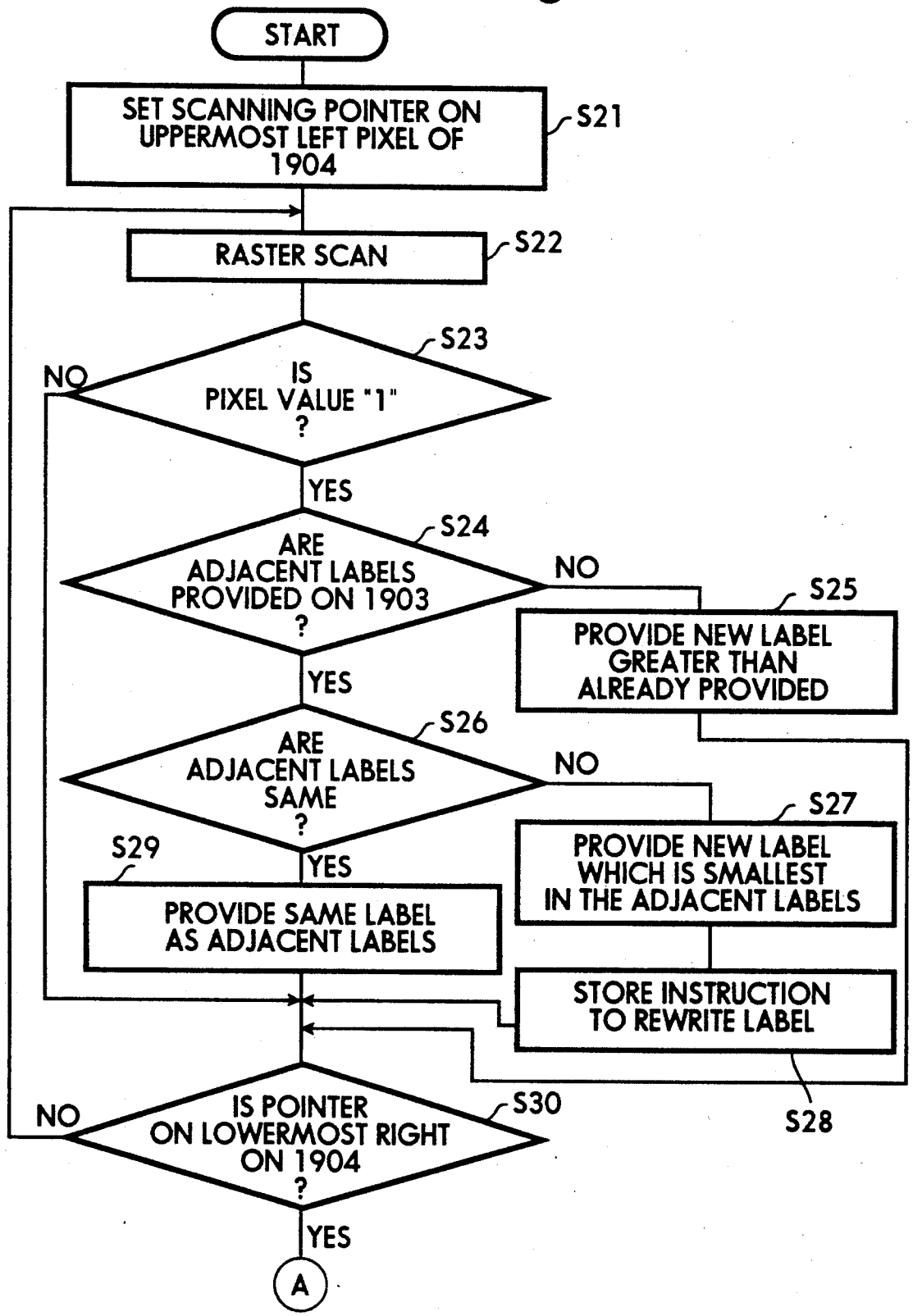
FIGS. 21E and 21F are flowcharts explaining the operation of the seventh embodiment.

Using the binarization circuit 1901, pixels of an image are labeled by using two values: 1 for pixels with over an absolute value of the average flow rate and 0 for other pixels. The labeled pixels stored in a binary image frame memory 1904 as shown in FIG. 21A. Next, the labeling circuit 1902 is used so as to scan the pixels on the binary image frame memory 1904 and perform a labeling processing as shown in FIGS. 21B to 21D by using the next algorithm, which is explained by the flow charts of FIGS. 21E and 21F. The label frame memory 1903 shown in FIG. 21B or FIG. 21D stores labels of pixels corresponding to the pixel values stored in the binary image frame memory shown in FIG. 21A. The way or method the labels are stored in the label frame memory 1903 is as follows.

In the flowchart of FIG. 21a, at step S21, the pointer of the raster scan is set on the uppermost left pixel of the binary image frame memory 1904 shown in FIG. 21A.

At step S22, raster scan is effected on the binary image frame memory 1904 pixel by pixel.

At step S23, a judgement or determination is made of whether the pixel value is "1". If it is not "1", the process goes to step S30 so that a judgement is made of whether the pointer is on the lowermost right of the binary image frame memory 1904. If it is not, the process returns back to step S22 to continue the raster scan.

If the pixel value is "1" at step S23, then at step S24, a judgement is made of whether the elements adjacent to the element corresponding to the scanning pixel are already labelled. The labels are positive numbers in this embodiment. Namely, the value "0" is not referred to as a label.

If the adjacent elements have not yet been labelled, then at step S25, a new label greater than the already provided number is provided to the element on the label frame memory 1903, and the process goes to step S30.

Note that the element provided with the new label corresponds to the pixel under scanning.

If the adjacent elements have already been labelled, then at step S26, a judgement is made of whether the adjacent labels are the same as each other. If they are not the same, then at step S27, a new label which is the smallest number in the adjacent labels is provided to the element corresponding to the pixel under scanning. Then, at step S28, an instruction to rewrite a label which is the same as the adjacent label but different then the new label provided to the element under scanning is stored in a memory (not shown in FIG. 19). Then, the process goes to step S30.

If the adjacent labels are the same at step S26, then at step S29, the same label as the adjacent labels is provided to the element under scanning. Then the process goes to step S30.

At step S30, a judgement is made of whether the pointer is on the lowermost right of the label frame memory 1903. If it is not, the process goes back to step S22.

Figure 21F:
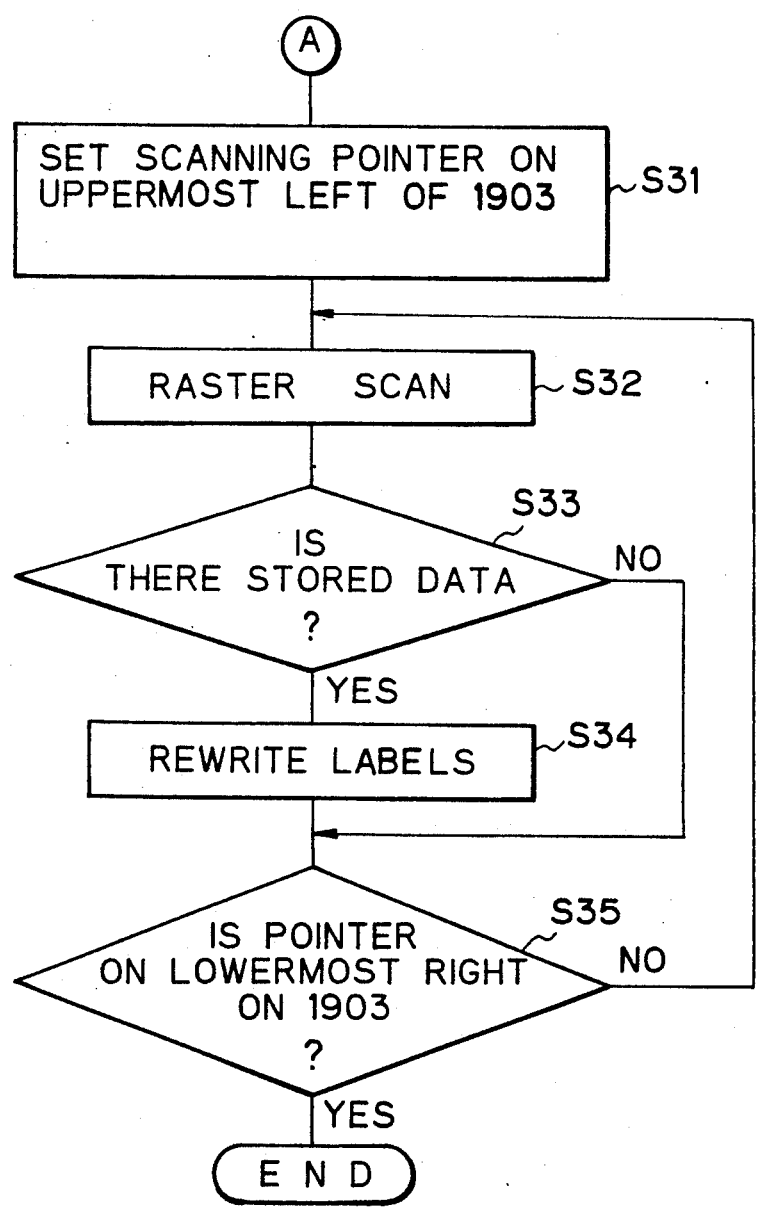

If the pointer is on the lowermost right of the frame memory 1903 at step S30, the process goes to the rewriting process shown in FIG. 21F.

In FIG. 21F, at step S31, the scanning pointer is set on the uppermost left of the label frame memory 1903.

At step S32, a raster scan is effected again.

At step S33, a judgement is made of whether the label is the same as the label in the stored instruction. If it is not the same, the process goes to step S35.

If the label is the same as the label in the stored instruction, then at step S34, the label is rewritten in accordance with the instruction stored in the memory at step S28. Then, at step S35, a judgement is made as to whether the pointer is on the lowermost right on the label frame memory 1903. If it is not, the process goes back to step S32. If the answer is yes at step S35, the label rewriting process is completed.

The practical labelling process is further explained with reference to FIGS. 21A to 21D.

After all pixels in the binary image frame memory 1904 are provided with the binary values "0" or "1" as shown in FIG. 21A, the raster scan is effected or performed on the binary image frame memory 1904. The first "1" is found on the pixel (3,3) of the memory 1904 in FIG. 21A. Then, it is checked whether the adjacent labels are already provided. In FIG. 21B, the elements (2,2), (3,2), (4,2), and (2,3), which are adjacent to the element (3,3) corresponding to the scanning pixel (3,3) of the memory 1904, are not labelled, i.e., they are "0". Therefore, the element (3,3) of the memory 1903 is labelled "1", because the number "1" is the smallest number in the already provided label. Note that only the upper left (2,2), the direct upper (3,2), the upper right (4,2), and the left (2,3) elements in the adjacent elements are actually checked, and the other adjacent elements (4,3), (2,4), (3,4), and (4,4) are not checked because these elements have not yet been scanned.

The second "1" is found on the pixel (5,3) of the memory 1904. Since the elements (4,2), (5,2), (6,2), and (4,3), which are adjacent to the element (5,3) corresponding to the scanning pixel (5,3) of the memory 1904, are not labelled, the element (5,3) is labelled by a new label "2" which is different from the already provided label.

The third "1" is found on the pixel (6,3) of the memory 1904. Since the only one adjacent element (5,3) is labelled "2", the element (6,3) corresponding to the pixel (6,3) is labelled "2" (see step S29 in FIGS. 21B).

The fourth "1" is found on the pixel (3,4) of the memory 1904. Since the only adjacent element (3,3) is labelled "1", the element (3,4) corresponding to the pixel (3,4) is labelled "1" (see step S29).

The fifth "1" is found on the pixel (5,4) of the memory 1904. Since the adjacent elements (5,3) and (6,3) are labelled with the same number "2", the element (5,4) corresponding to the pixel (5,4) is labelled "2" (see step S29).

Similarly, the pixels (6,4) and (3,5) are labelled "2" and "1", respectively.

Note that, in labelling the pixel (4,5) it is found that the adjacent pixels (3,4) and (3,5) are labelled "1" but the adjacent pixel (5,4) is already labelled "2". In this case, according to step S27, the smallest adjacent label, which is "1" is this case, in provided. Since the pixel (4,5) and the pixel (5,4) are adjacent to each other but the labels of them are different from each other, an instruction to rewrite the label "2" to "1" is stored in the memory at step S28.

Similarly, the pixel (5,5) is labelled "1" because the smallest number in the adjacent labels is "1".

The pixel (9,5) is labelled "3" because there is no adjacent label and the label "1" and "2" are already provided so that the smallest new label is "3".

In the similar way, the pixels (11,5), (4,6), (9,6) (10,6), (11,6), (8,7), (9,7), and (10,7) are labelled "4", "1", "3", "3", "3", "3", "3", and "3", respectively.

Then, the label rewriting is effected in accordance with the stored instructions. Namely, in scanning the label frame memory, when the label "2" is found, it is rewritten to "1". Similarly, when the label "4" is found. it is rewritten to "3". Thus, the rewritten label frame memory is obtained as shown in FIG. 21D.

Figure 20A:
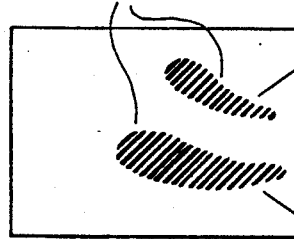
Figure 20B:
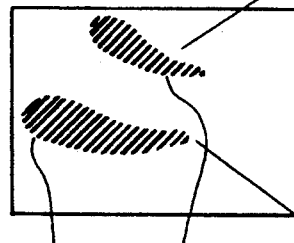
Figure 20C:
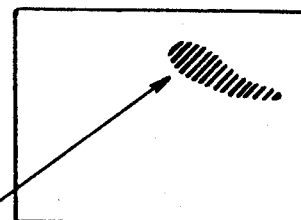
Figure 20D:
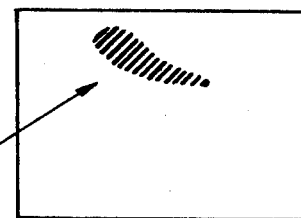
Figure 20E:
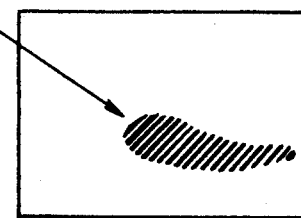
Figure 20F:
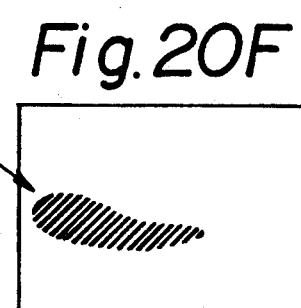

By the above algorithm, the label is written in the label frame memory 1903. The original image and label are read out by raster scanning simultaneously from the original image frame memory 108 and the label frame memory 1903. Using the decoder 1905, when the label value is 1, the gate 1201 becomes active, while when the label value is 2, the gate 1202 becomes active and the results are stored in the divided image frame memories 1205 and 1207 as shown in FIG. 20C and FIG. 20E. Further, in the next frame, the switches 1210 and 1209 are switched. When after the above-mentioned label processing etc., when the label value becomes 1, the gate 1201 becomes active, and while when the label value is 3, the gate 1202 becomes active. The results are stored in the divided image frame memories 1206 and 1208 as shown in FIGS. 20D and 20F. The switches 1210 and 1209 may be controlled by the outputs of the decoder 1905. When the number of different labels is three or more, the number of gates and the number of divided image frame memories is also increased.

Figure 22:
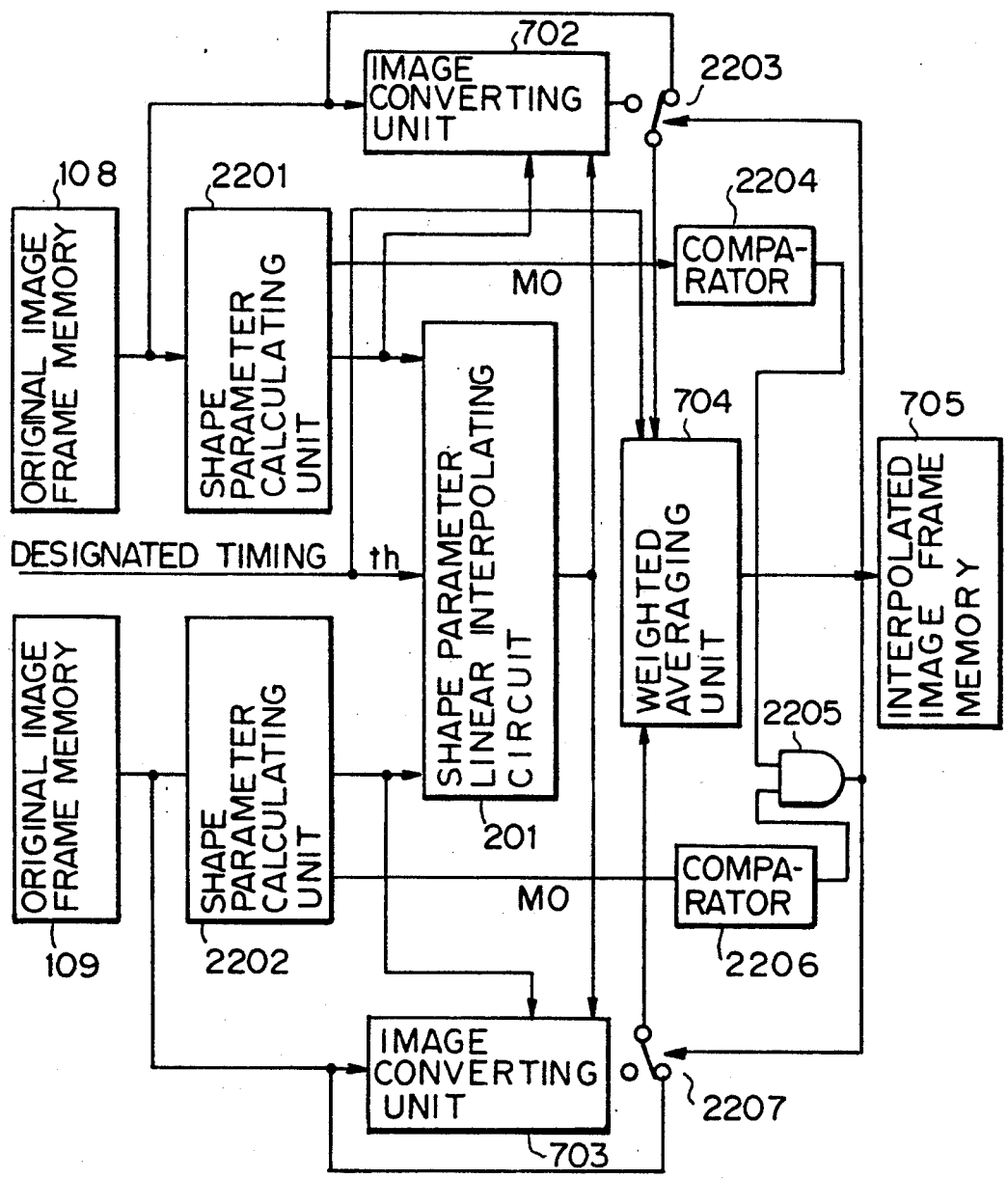
FIG. 22 is a constitutional view of the eighth embodiment of the present invention.

FIG. 22 shows an eighth embodiment of the present invention. In FIG. 22, components which are the same as in FIG. 7 are shown by the same reference numerals. In addition, reference numerals 2201 and 2202 are shape parameter calculating units which calculate the parameters showing the shape of the blood flow region and the zero order moment M0 of the blood flow region, and 2203 and 2207 are switching devices which change the path of the signals based on the control signal. Further numerals 2204 and 2206 are comparators which compare the output of the shape parameter calculating units 2201 and 2202 with previously determined labels and output the results of the comparison as logical level signals, and 2205 is an AND gate. In this embodiment, the object is to find the interpolated image by using only the weighted averaging unit when there is no blood flow region in one or more of the original images. Here, in the shape parameter calculating units 2201 and 2202, the output M0 found by the equation (2) is output, and, depending on whether it is above a level previously set, a logical level true or logical level false is output by the comparators 2204 and 2206. The logical product of the comparators output is taken by the AND gate 2205, and output the switches 2203 and 2207. When there is no blood flow region in at least one image, the image converting units 702 and 703 can be bypassed and an interpolated image can be found by just the weighted averaging unit 704.

Figure 23A:
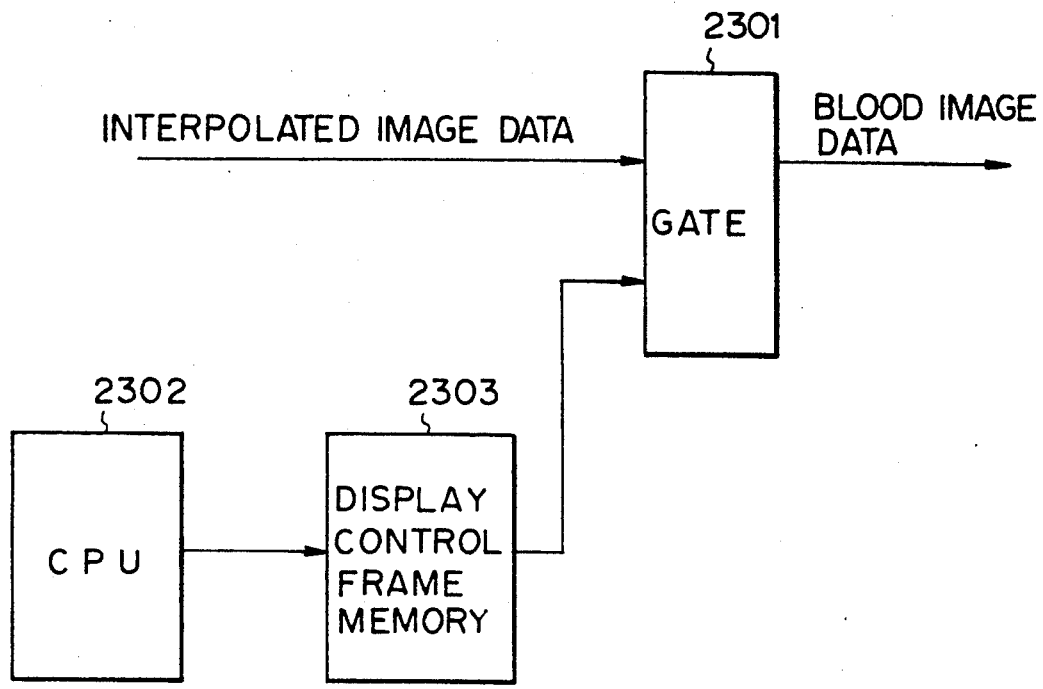
FIGS. 23A, 23B and 23C are constitutional views of the ninth embodiment of the present invention.
Figures 24A, 24B:
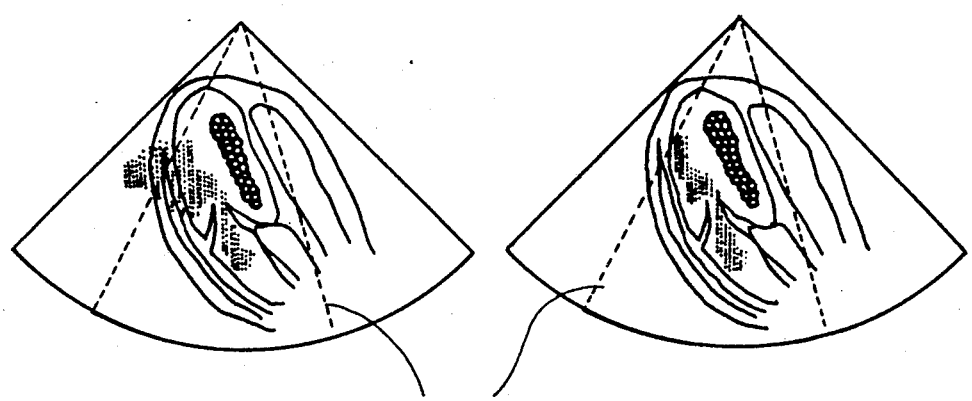
FIGS. 24A and 24B are explanatory views of the effect of the ninth embodiment.

FIG. 23A shows a ninth embodiment. In the figure, 2303 is a display control frame memory which records the displayed and nondisplayed information in pixel units, 2302 is a CPU which initializes 2303 so that only the pixels of the flow rate data of the blood flow speed data are made 1, and 2301 is a gate which controls the display of the interpolated image data. In this ninth embodiment, since there is a possibility of an extremely unnatural or incorrect image resulting if there is a display of blood flow regions even at portions deviated from the blood flow measurement region where the inherent blood flow speed data was measured, as shown in FIG. 24A, in the obtained interpolated image, the object is to suppress the display other than in the blood flow measurement region as shown in FIG. 24B. For example, it is unnatural for a blood flow region to exist in an area outside of the muscle region displayed by the B mode.

Figure 23B:
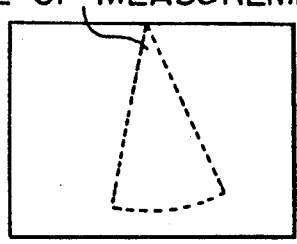
Figure 23C:
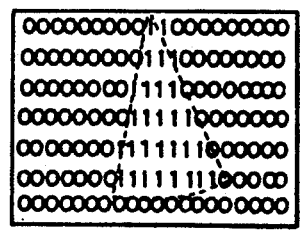

FIG. 23B shows the blood flow measurement region, and FIG. 23C shows the contents of the display control frame memory.

As shown in FIG. 23C, the display control frame memory 2303 has written in its memory from the CPU 2302 a value of 1, corresponding to the logical level true, for pixels in the blood flow speed data measurement range and a value of 0, corresponding to the logical level false, for other pixels. Further, synchronously with the readout of the interpolated image data, the display control frame memory 2303 is read and the output is used to control the gate 2301, so that the gate outputs blood flow image data having data in only the blood flow speed data measurement range.

FIG. 25 shows a tenth embodiment. In FIG. 25 2501 shows an interpolated image frame memory which records interpolated image data of a positive average flow rate, and 2502 is an interpolated image frame memory which records interpolated image data of a negative average flow rate. Reference numeral 2503 is a selector, which selects and passes as the interpolated image data the interpolated image data recorded in one of the interpolated image frame memories 2501 or 2502 in accordance with the control signal, and 2504 and 2505 are absolute value circuits which obtain the absolute values of the image data from the interpolated image frame memories 2501 and 2502 of the previous stage. In address numeral 2506 is a comparator which compares the interpolated image data made into absolute values from the absolute value circuits 2504 and 2505 of the previous stage and outputs a logical level signal.

In this embodiment, the object is to display whichever of the interpolated image data of a positive average flow rate and the interpolated image data of a negative flow rate has a larger absolute value of average flow rate. First, the interpolated image data of a positive average flow rate is stored in the interpolated image frame memory 2501 and the interpolated image data of a negative average flow rate is stored in the interpolated image frame memory 2602. The two are simultaneously read to obtain the absolute values of the average flow rate at the absolute value circuits 2504 and 2505. At the comparator 2506, whichever absolute value of the flow rate is largest is output as a logical level signal which is used to control the selector 2503, and either the interpolated image data of the positive average flow rate or the interpolated image data of the negative average flow rate will be output. Of course, the blood flow image data includes not only average flow rates, but also flow rate dispersion. Here, only in the case when the interpolated image is of a positive average flow rate, is it possible to obtain the interpolated image of the blood flow region of a mosaic pattern as obtained in the sixth embodiment or the interpolated image as obtained in the seventh embodiment of the invention. Then the next step is to select out of all the interpolated images the one which has the largest absolute value of average flow rate.

Figure 26:
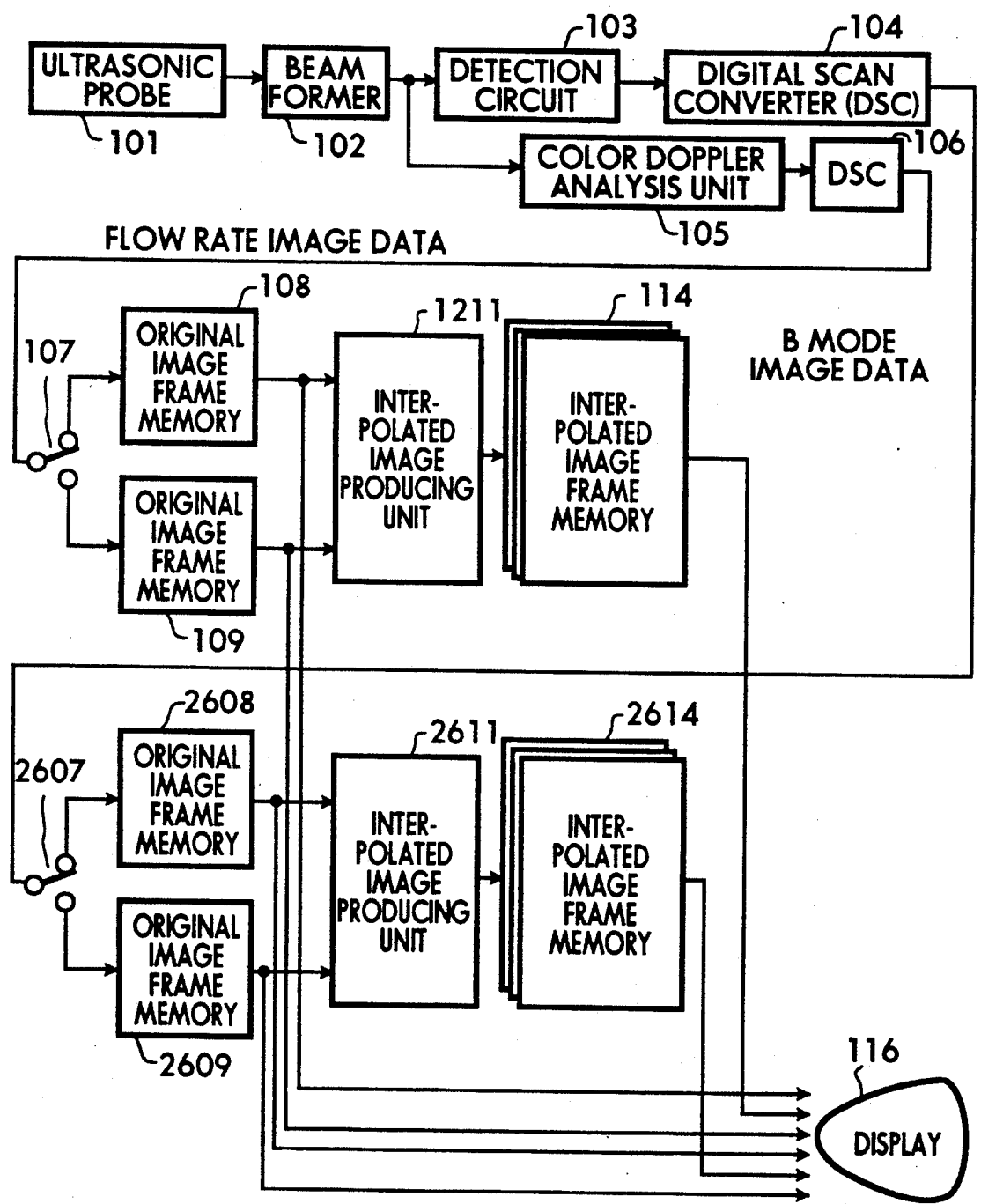
FIG. 26 is a constitutional view of the 11th embodiment of the present invention.

FIG. 26 shows an eleventh embodiment. In FIG. 26 components which are the same as in FIG. 1 and FIG. 2 are shown by the same reference numerals. In addition, numeral 2607 is a switch which switches the path of the B. mode image data, 2608 and 2609 are original image frame memories which record the original image data, and 2611 is an interpolated image producing means or unit which produces an interpolated image for the B mode image.

The object of this eleventh embodiments is to enable an interpolated image to be obtained and to further obtain a natural or correct image by providing an interpolated image producing unit as shown in FIG. 26 for the B mode image too as in the first embodiment.

Figure 27:
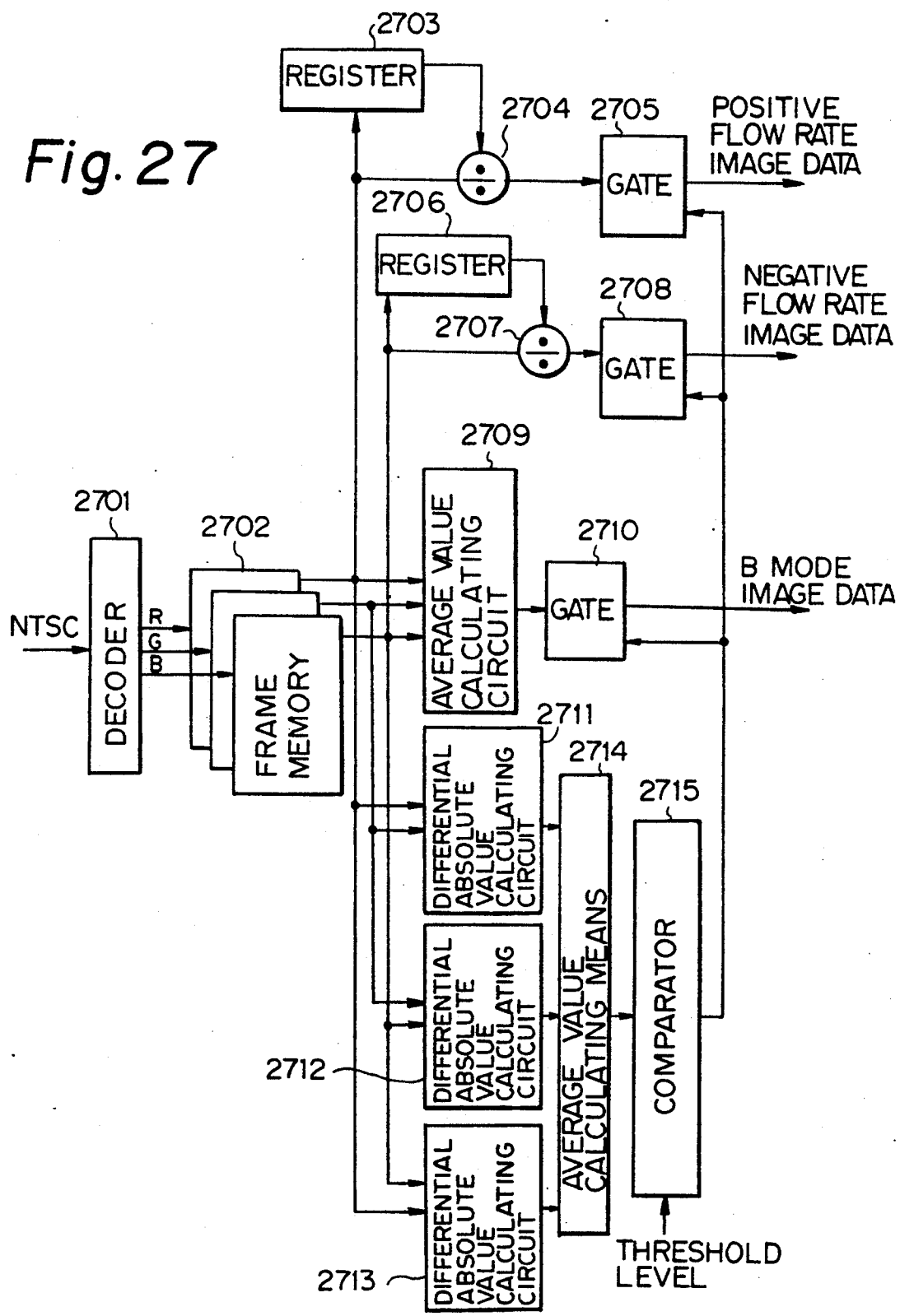
FIG. 27 is a constitutional view of the 12th embodiment of the present invention.

FIG. 27 shows a twelve embodiment. In FIG. 27, 2701 is a decoder which converts the NTSC (National Television Standards Committee) signal into an RGB (Red-Green-Blue) signal, 2702 is a frame memory which records the image data, 2703 and 2706 are registers which record values temporarily, 2704 and 2707 are dividers which output remainders of the two inputs, and 2705, 2708, and 2710 are gate circuits which pass input signals in accordance with a control signal.

Reference numeral 2709 is an average value calculating circuit which obtains the average value of image data recorded in the three parts RGB of the frame memory 2702 of the previous stage, 2711 to 2713 are differential absolute value calculating circuits which output the absolute value of the difference of two inputs. In addition, reference numeral 2714 is an average value calculating circuit or means which finds and outputs the average value of the three outputs of the differential absolute value calculating circuits 2711 to 2713 of the previous stage, and 2715 is a comparator which compares the predetermined threshold level and the magnitude of the signal from the average value calculating circuit 2714 of the previous stage. The result is then output as a logical level-signal.

The twelfth embodiment is worked or constructed with the object of separating the synthesized image of the B mode image and the flow image obtained from the video output from a VTR or ultrasonic diagnostic apparatus into the B mode image and flow image.

Figure 28:
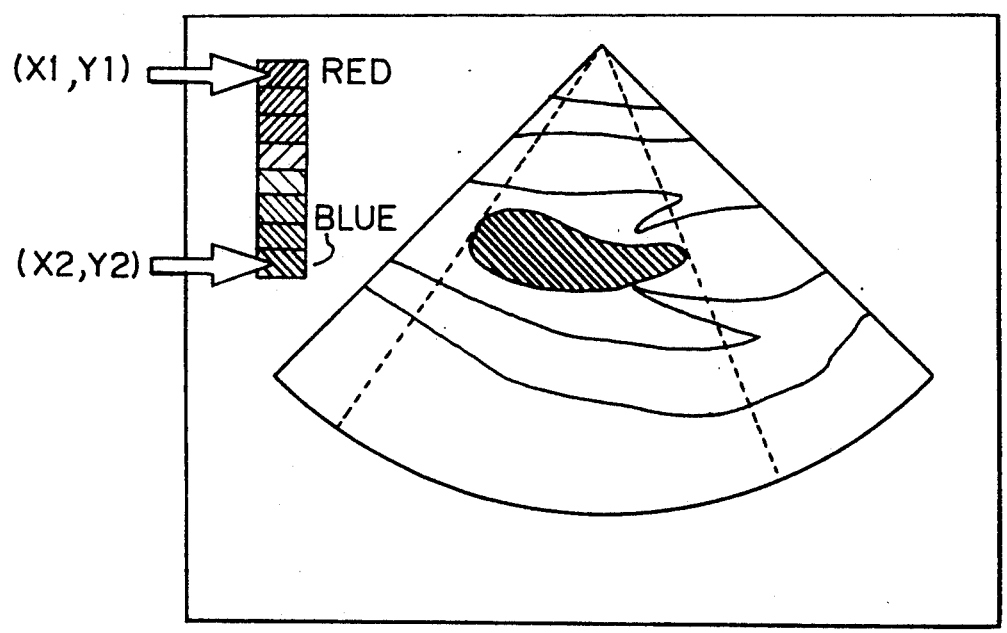
FIG. 28 is an explanatory view of the operation of the 12th embodiment of the present invention.

First, the NTSC signal obtained from the output of for example a VTR or the other diagnostic apparatus is converted into RGB by the decoder 2701 and recorded in the frame memory 2702. Next, the address (X1, Y1), (X2, Y2) on the color bar shown in FIG. 28 where the largest value of the flow rate data is recorded is accessed and the data is stored in the registers 2703 and 2706. Further, the pixels are successively read, and the differential absolute value calculating circuits 2711, 2712, and 2713, the average value calculating circuit 2714, and the comparator 2715 are used to see if the value of the RGB fluctuates exceeding the threshold level. Next it is determined if the pixel carries black and white B mode data or carries color blood flow speed data and the gates 2705, 2708, and 2710 are controlled to output or not output three types of data, i.e., the flow image data of a positive average flow rate, the flow image data of a negative average flow rate, and the B mode image data.

Here, the average value calculating circuit 2709 obtains the average of the R (Red), G(Green) and B(Blue) data to create a more accurate B mode image data.

Further, the dividers 2704 and 2707 are used to normalize the blood flow speed data at the maximum value, whereby it is possible to fetch accurate flow rate data regardless of the level fluctuations of the NTSC signal.

Figure 29:
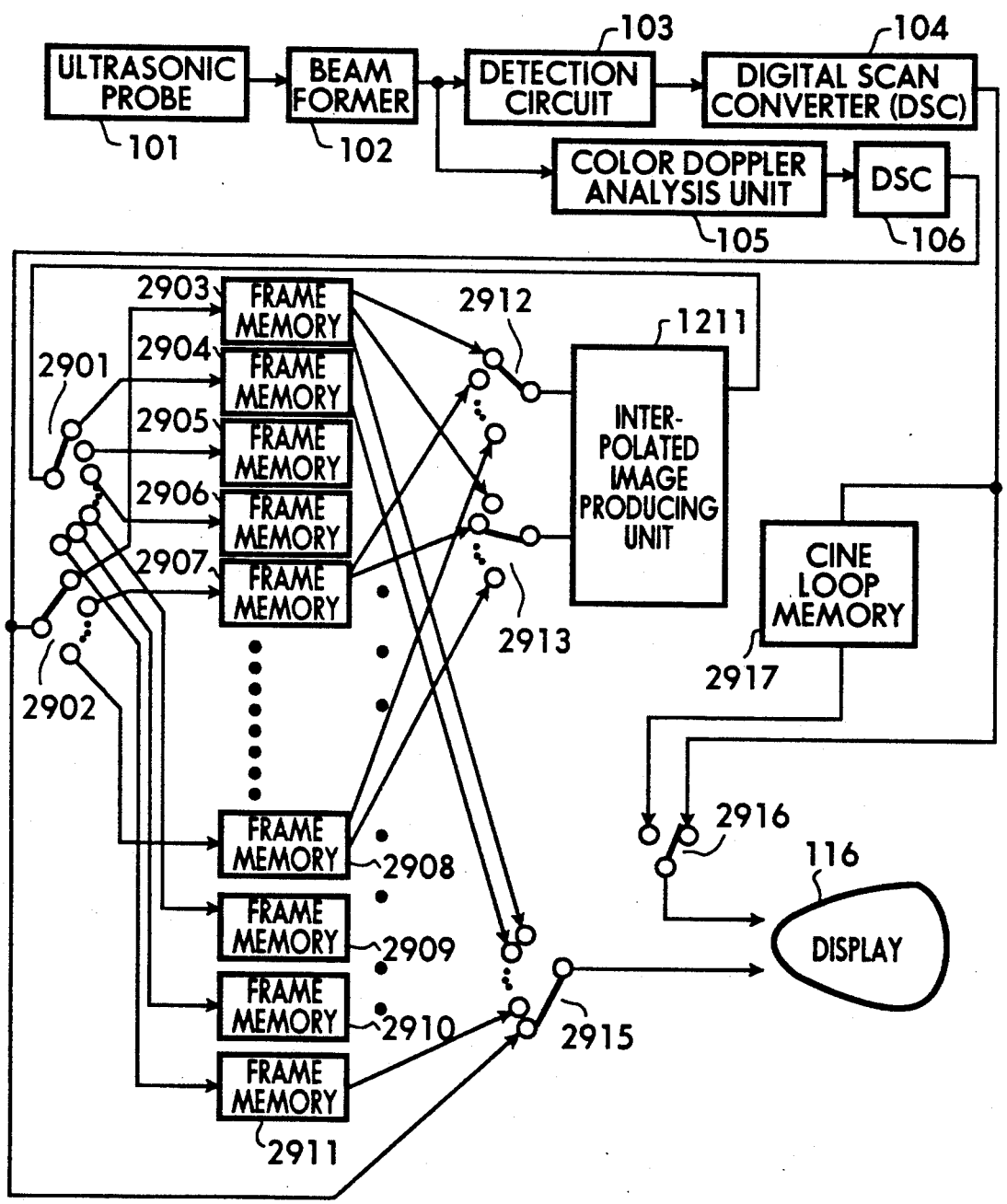
FIG. 29 is a constitutional view of the 13th embodiment of the present invention.
Figure 30A:
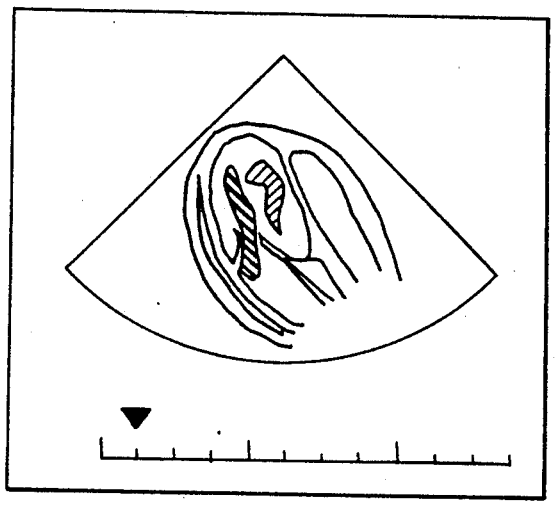
FIGS. 30A and 30B are explanatory views of the display method in the 13th embodiment of the present invention.
Figure 30B:
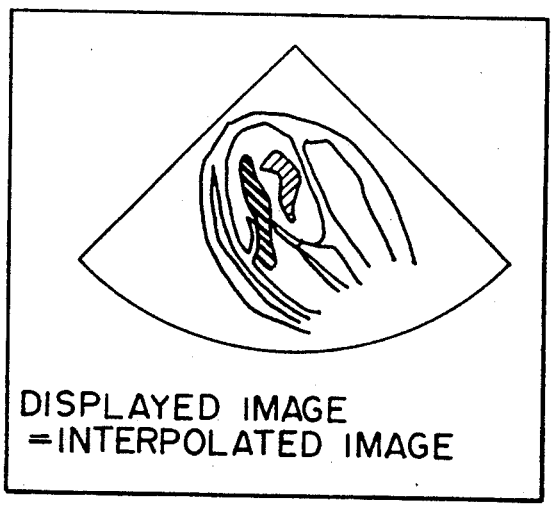

FIG. 29 shows a thirteenth embodiment. In FIG. 29, components which are the same as in FIG. 1 and FIG. 12 are shown by the same reference numerals. Reference numeral 2902 is a switch which outputs the flow image data to any frame memory, 2903, 2907, 2908 are frame memories which record original images, 2912 and 2913 are switches which select the frame memories in which the original images are recorded, and 2901 is a switch which outputs an interpolated image to any frame memory. In addition, reference numerals 2905 to 2907 and 2909 to 2911 are frame memories which record interpolated images, 2915 is a switch which selects one of the frame memories 2903 to 2911, 2917 is a cine loop memory which records a plurality of B mode images, and 2916 is a switch which selects the path of the B mode image displayed. This embodiment has as its object performing interpolation in the case of use of the cine loop function. Since it does not matter if some time is taken or expanded for the production or generation of the interpolated image, it becomes possible to use a device with a relatively low speed for the image converting means etc. and it is possible to perform a plurality of functional blocks having the same function using only a single functional block. Thus a reduction of the price can be anticipated. The flow image is, in the same way as the usual cine loop function, recorded in the frame memories 2903, 2907, and 2908 by operating the switch 2902. After freezing switch 2902 on a specific frame memory, the switch 2915 is used to successively display the frame memories 2903, 2907, and 2908 and it is confirmed that the series of images desired to be interpolated have been recorded. At this stage, there is no difference between this thirteenth embodiment and the usual cine loop function. Further, by operating the switches 2912 and 2913, interpolated images are produced by the interpolated image producing unit 1211 disclosed in the first embodiment and the switch 2901 is used to record the same in the frame memories 2904, 2905, 2906, 2909, 2910, and 2911. Interpolated images are produced and recorded for all the original image pairs, and switch 2915 is used to successively display the frame memories 2903 to 2911. It is then possible to display everything including the interpolated images. Further, a separate cine loop memory 2917 is provided and the B mode image data is read from the cine loop memory 2917 at the time of the cine loop function of the blood flow image, whereby it is possible to display the B mode image combined. Also, when using this cine loop function to display the interpolated image, it is necessary to confirm if the image is an interpolated image or a original image. This may be done either, when displaying a cursor or graduation showing the frame position of the cine loop, by making the height of the graduation appear low at the position of an interpolated image as shown in FIG. 30A, indicating by a letter, mark, etc. that "displayed image = interpolated image" as shown in FIG. 30B, or making another such display.

Figures 31A, 31B:
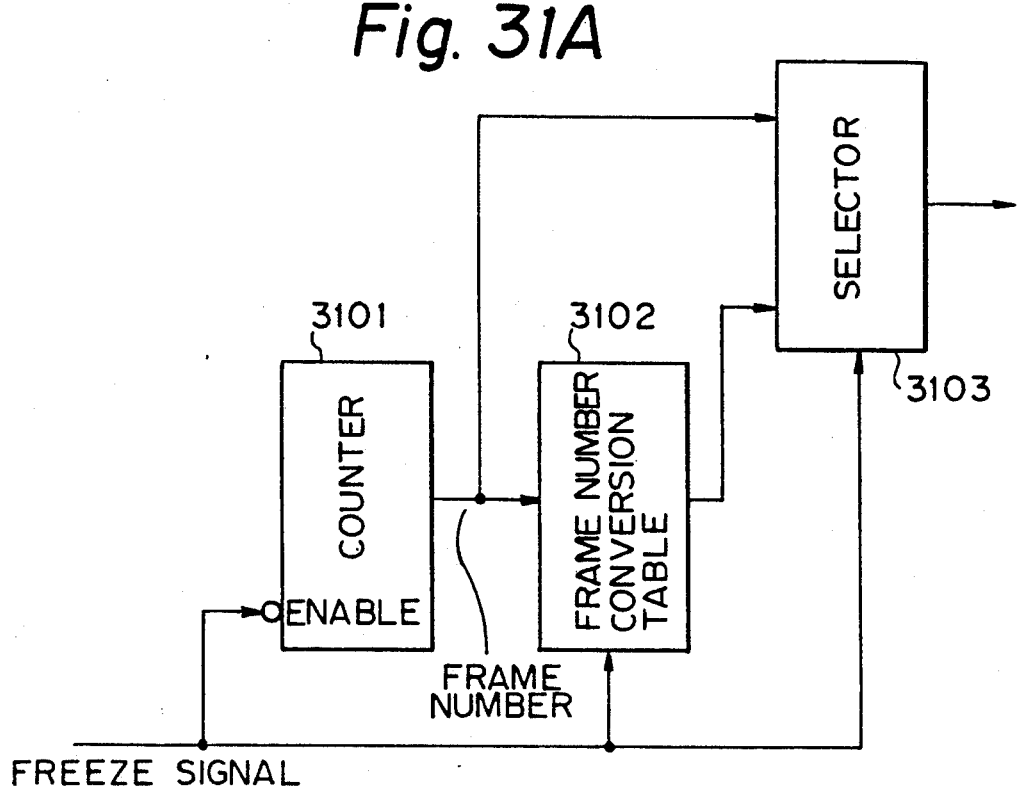
FIGS. 31A and 31B are explanatory views of the control method in the 13th embodiment of the present invention.

Further, when a freeze is performed during the display of an interpolated image, the doctor would feel uneasy making a diagnosis by viewing a frozen interpolated image. By controlling the switch 2916 as shown in FIG. 31A so as to stop only at the position of the frame memory, it is possible to freeze the position of then original image and therefore assist the doctor to make a confident diagnosis. FIG. 31A shows the means for freezing only at the position of an original image. In the figure, 3101 is a counter which produces a displayed frame number, 3102 is a frame number conversion table which converts the frame number, and 3103 is a selector which passes one of the two inputs in accordance with a control signal.

A frame number displayed by the counter 3101 is produced and the frame number of the original image closest to the frame displayed as shown in FIG. 31B is recorded in the frame number conversion table 3102. The usual operation is for the counter 3101 to continue counting and for the selector 3103 to pass the output signal of the counter 3101 and control the switch 2915 in FIG. 29. If a freeze signal enters, the counter 3101 stops the count operation, the selector 3103 passes the output of the frame number conversion table 3102, and the switch 2915 is set to the original image.

Further, when working this thirteenth embodiment, use is made of the average speed or the speed dispersion as the blood flow data, but it is also possible to use the Doppler signal power instead.

As explained above, according to the present invention, there is provided a color Doppler ultrasonic diagnostic apparatus wherein it is possible to produce, insert, and display natural interpolated images between original image frames, and it is possible to view the state of the blood flow as if it were changing extremely smoothly. Thus features greatly much to the improvement of the performance of the color Doppler ultrasonic diagnostic apparatus.

We claim:

1. An ultrasonic color Doppler diagnostic apparatus for displaying at least two successive frames of original images of two-dimensional images obtained for each ultrasonic interframe time, including an ultrasonic probe transmitting an ultrasonic pulse in a plurality of directions as a signal with respect to a specimen, the ultrasonic color Doppler diagnostic apparatus processing the signal received to obtain results, and displaying the results of a two-dimensional image result of one of an average speed, a speed dispersion, and a Doppler signal power of blood flowing in the specimen, the ultrasonic color Doppler diagnostic apparatus comprising:

shape parameter calculating means for calculating shape parameters indicating shape of blood flow regions on the original images;

shape parameter interpolating means for calculating interpolated shape parameters at a designated timing designated by said ultrasonic interframe time using said shape parameters, said ultrasonic interframe time, and said designated timing;

image converting means for converting an image of at least one frame of an original image in the original images in accordance with the interpolated shape parameters at the designated timing used by said shape parameter interpolating means producing an interpolated image; and displaying means for displaying moving images comprised of the interpolated image inserted between the original images and the moving images of only the interpolated image.

2. An ultrasonic color Doppler diagnostic apparatus as set forth in claim 1, wherein:

said at least two successive frames of original images comprising first and second frame original images;

said image converting means produces first and second interpolated images; and said apparatus further comprising weighted averaging means for weighting said interpolated image produced by said image converting means producing weighted interpolated images and for averaging the weighted interpolated images, said weighted averaging means comprising:

first weighting means for weighting, by a value (t2−th)/(t2−t1), the first inpolated image producing a weighted first interpolated image, t1 being a first timing corresponding to the first frame original image, t2 being a second timing corresponding to the second frame original image, and th being said designated timing, said first interpolated image being produced by said image converting means converting said first frame original image;

second weighing means for weighting the second interpolating image by said value (t2−th)/(t2−t1) producing a weighted second interpolated image, where said second interpolated image is produced by said image converting means converting said second frame original image; and adding means for adding the weighted first and second interpolated images.

3. An ultrasonic color Doppler diagnostic apparatus as set forth in claim 2, further comprising:

blood flow region presence juding means for detecting a region in which the blood is flowing in at least one original image in the at least two successive frames of the original images forming a detection result; and image interpolation bypassing means for bypassing said image converting means in accordance with the detection result, and for directly inputting the at least one original image into the weighted averaging means.

4. An ultrasonic color Doppler diagnostic apparatus as set forth in claim 1, wherein said at least two successive frame of the original images comprises a second frame original image; and said shape parameter interpolating means comprises shape parameter linear interpolating means for performing a linear interpolation on the shape parameters of the second frame original image in accordance with the ultrasonic interframe time and the designated timing and calculating the interpolated shape parameters.

5. An ultrasonic color Doppler diagnostic apparatus as set forth in claim 1, wherein said shape parameter interpolating means comprises shape parameter high order interpolating means for calculating any function passing through the shape parameters of at least three frames of the original images, and then for calculating the interpolated shape parameters at the designated timing as values of the function at the designated timing.

6. An ultrasonic color Doppler diagnostic apparatus as set forth in claim 1, wherein:

said shape parameter calculating means calculates frames; and said apparatus further comprising shape parameter averaging means for averaging a plurality of frames worth of the shape parameters for each of the frames calculated in said shape parameter calculating means.

7. An ultrasonic color Doppler diagnostic apparatus as set forth in claim 1, wherein:

said shape parameter interpolating means comprises an interpolated image producing means for producing the interpolated images; and said apparatus further comprising:

characteristic judging means for determining a characteristic of the one of the average speed, the speed dispersion, and the Doppler signal power of the blood flowing in the specimen at pixels of the original images; and image dividing means for dividing into a plurality of images the original image producing divided images in accordance with the characteristic of the one of the average speed, the speed dispersion, and the Doppler signal power of the blood flowing in the specimen, the divided images produced by the image dividing means being deemed as the original images are input to said interpolated image producing means for producing the interpolated images using the divided images.

8. An ultrasonic color Doppler diagnostic apparatus as set forth in claim 7, wherein:

said average speed includes a sign; and said characteristic judging means comprises sign juding means for performing a determination of the sign of the average speed.

9. An ultrasonic color Doppler diagnostic apparatus as set forth in claim 7, wherein said characteristic judging means comprises mosaic pattern juding means for determining that a first number of the pixels having the average speed of over a first predetermined speed +Vth and a second number of the pixels having the average speed less than a second predetermined speed −Vth, in the pixels surrounding and including a particularly noted pixel, together are more than a predetermined number indicating a mosaic pattern formed by the pixels.

10. An ultrasonic color Doppler diagnostic apparatus as forth in claim 7, wherein:

the pixels adjoin forming a single cluster having connecting portions; and said characteristic judging means comprises labeling means for applying a same label to the pixels constituting the connecting portions for each of the connecting portions where the pixels adjoin and form the single cluster.

11. An ultrasonic color Doppler diagnostic apparatus as set forth in claim 7, wherein said displaying means comprises interpolated image synthesizing means for displaying among the pixels of the interpolated image produced from the divided images, the pixels with maximum absolute values of the average speed of the blood flow.

12. An ultrasonic color Doppler diagnostic apparatus as set forth in claim 1, wherein the displaying means comprises display suppressing means for suppressing a display of pixels outside of a range of measurement of one of the average speed, the speed dispersion, and the Dopper signal power of the blood flowing in the specimen.

13. An ultrasonic color Doppler diagnostic apparatus set forth in claim 1, wherein the two-dimensional image result of the one of the average speed, the speed dispersion, and the Doppler signal power of the blood flowing through the specimen is used as the original image and at a same time a B mode image is used as a B mode original image to produce and display a B mode interpolated image of the B mode image.

14. An ultrasonic color Doppler diagnostic apparatus as set forth in claim 1, further comprising:
 image separating means for separating a B mode image and the two-dimensional image result of the one of the average speed, the speed dispersion, and Doppler signal power of the blood flowing in the specimen from one of an NTSC, an RGB, and an other image signal; and
 flow rate data normalizing means for normalizing a pixel value of the two-dimensional image result of one of the average speed, the speed dispersion, and the Dopper signal power of the blood flowing in the specimen, using the pixel value of a color bar showing a correspondence between the one of the average speed, the speed dispersion, and the Doppler signal dispersion of the blood flowing in the specimen and a color.

15. An ultrasonic color Doppler diagnostic apparatus as set forth in claim 1, further comprising:
 an original image frame memory for storing at least three frames,
 original image selecting means connected to said original image frame memory for selecting two frames of the original images from the original image frame memory,
 an interpolated image frame memory for storing the interpolated image connected to said original image selecting means; and
 displayed frame selecting means for selecting any one frame stored in the original image frame memory and the interpolated image frame memory, the interpolated image being displayed at a time of reproduction of a cine loop.

16. An ultrasonic color Doppler diagnostic apparatus as set forth in claim 15, further comprising a display format for one of notifying at the time of the reproduction of the cine loop and freezing if a displayed image is one of the original image and the interpolated image.

17. An ultrasonic color Doppler diagnostic apparatus as set forth in claim 15, wherein a frame to be frozen at the time of the reproduction of the cine loop is specified as an original image frame 18. A diagnostic apparatus determining fluid characteristics of a fluid having an original image, comprising:
 shaped parameter means for calculating shape parameters representative of local geometry of flow of the fluid; and
 image converting means for converting the original image using the shape parameters, producing an image indicating the fluid characteristics.

19. A diagnostic apparatus as set forth in claim 18, further comprising shaped parameter interpolating means for calculating interpolated shape parameters using the shape parameters of successive images of the fluid, and said image converting means converts the successive image using the interpolated shape parameters producing an interpolated image indicating the fluid characteristics.

20. A diagnostic apparatus as set forth in claim 18, wherein said shaped parameter means calculates said shape parameters by fitting an ellipse substantially around the original image.

21. A method for determining fluid characteristics of the fluid having an original image, comprising the steps of:
 (a) calculating shape parameters representative of local geometry of flow of the fluid; and
 (b) converting the original image using the shape parameters, producing an image indicating the fluid characteristics.

22. A method for determining fluid characteristics as set forth in claim 20, further comprising the step of calculating interpolated shape parameters before said converting step (b) using the shape parameters of successive images of the fluid, and said converting step (b) converts the successive images using the interpolated shape parameters producing an interpolated image indicating the fluid characteristics.

23. A method for determining fluid characteristics as set forth in claim 21, wherein said calculating step (a) calculates said shape parameters by fitting an ellipse substantially around the original shape.

* * * * *

UNITED STATES PATENT AND TRADEMARK OFFICE
CERTIFICATE OF CORRECTION

PATENT NO. : 5,215,093
DATED : June 1, 1993
INVENTOR(S) : Toshiya MIYAZAKI et al.

It is certified that error appears in the above-indentified patent and that said Letters Patent is hereby corrected as shown below:

On the title page:
Item: [57] ABSTRACT

Cover Page, line 8, change "and," to --, and--;

line 12, change "time. In addition and the designated timing, an" to --time, and the designated timing.--; and line 13, before "image" insert --In addition, an--.

Col. 1, line 27, change "convectional" to --conventional--.

Col. 2, lines 25 and 26, change "functions" to --function--;

line 37, change "as" to --is--;

line 58, change "convention" to --converting--; and lines 59 and 60, change "as weighing measuring unit modules" to --the weighting averaging unit includes--.

Col. 3, line 4, change "interpolation" to --interpolating--;

line 5, before "thereby" insert --means--;

line 10, change ";" to --.--;

line 11, delete "for,"; and line 54, change ";" to --.--.

Col. 4, line 19, change "insulated" to --included--.

UNITED STATES PATENT AND TRADEMARK OFFICE
CERTIFICATE OF CORRECTION

PATENT NO. : 5,215,093
DATED : June 1, 1993
INVENTOR(S) : Toshiya MIYAZAKI et al.

It is certified that error appears in the above-indentified patent and that said Letters Patent is hereby corrected as shown below:

Col. 5, line 40, change "34G" to --34D--.

Col. 6, line 3, delete ",";
line 16, change "was" to --as--; and
line 44, change "li" to --Li--.

Col. 7, line 10, change "may result" to --results--.

Col. 9, line 30, change "threaded" to --threshold--.

Col. 10, line 1, change "above parameters calculation" to --shape parameter calculating--;
line 2, change "118" to --110--;
line 8, change "unit" to --units--; and
line 52, change "corresponds" to --corresponding--.

Col. 13, line 22, change "span" to --even--.

Col. 14, line 7, change "was" to --in a--;
line 17, change "Is" to --in--; and
line 53, change "determiners" to --determines--.

Col. 15, line 2, change "cutters" to --patterns--.

Col. 16, line 48, change "21a" to --21E--.

UNITED STATES PATENT AND TRADEMARK OFFICE
CERTIFICATE OF CORRECTION

PATENT NO. : 5,215,093
DATED : June 1, 1993
INVENTOR(S) : Toshiya MIYAZAKI et al.

It is certified that error appears in the above-indentified patent and that said Letters Patent is hereby corrected as shown below:

Col. 18, line 2, change "21B" to --21E--; and line 18, change "in" to --is--.

Col. 22, line 22, change "then" to --the--.

Col. 23, line 32, change "inpolated" to --interpolated--.

Signed and Sealed this

Seventh Day of June, 1994

BRUCE LEHMAN

*Attest:*

*Attesting Officer*     *Commissioner of Patents and Trademarks*